US 8,472,051 B2

(12) United States Patent
Sakiyama et al.

(10) Patent No.: US 8,472,051 B2
(45) Date of Patent: Jun. 25, 2013

(54) IMAGE FORMING APPARATUS AND METHOD FOR DISPLAYING PREVIEW IMAGE OF TOP PAGE OF MULTIPLE SUB-JOBS OF A PRINT JOB

(75) Inventors: Masahiro Sakiyama, Osaka (JP); Yoshikazu Kondoh, Osaka (JP); Masanori Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 862 days.

(21) Appl. No.: 12/610,654

(22) Filed: Nov. 2, 2009

(65) Prior Publication Data

US 2010/0118338 A1 May 13, 2010

(30) Foreign Application Priority Data

Nov. 11, 2008 (JP) ................................ 2008-288980
Nov. 14, 2008 (JP) ................................ 2008-291950

(51) Int. Cl.
*G06F 3/12* (2006.01)
*G06K 15/00* (2006.01)

(52) U.S. Cl.
USPC ........................................ 358/1.15; 358/1.18

(58) Field of Classification Search
USPC ................ 358/1.1, 1.2, 1.9, 1.13, 1.15, 1.18, 358/3.23, 527, 450; 382/124; 715/274, 526, 715/527; 345/427, 619
See application file for complete search history.

(56) References Cited

U.S. PATENT DOCUMENTS

| 7,559,024 B2* | 7/2009 | Mori et al. ..................... 715/273 |
| 7,599,100 B2* | 10/2009 | Higuchi et al. ............... 358/403 |
| 7,916,313 B2* | 3/2011 | Nishikawa ..................... 358/1.1 |
| 8,120,809 B2* | 2/2012 | Mori .............................. 358/1.18 |
| 2005/0168763 A1* | 8/2005 | Higuchi et al. ............... 358/1.13 |
| 2007/0165248 A1* | 7/2007 | Utsunomiya et al. .......... 358/1.1 |
| 2007/0229926 A1 | 10/2007 | Morisaki et al. |
| 2010/0302592 A1* | 12/2010 | Nishikawa ................... 358/1.16 |

FOREIGN PATENT DOCUMENTS

| JP | 2001-134394 | 5/2001 |
| JP | 2003-143342 | 5/2003 |
| JP | 2005-134798 | 5/2005 |
| JP | 2005-275836 | 10/2005 |
| JP | 2006-039467 | 2/2006 |
| JP | 2006-279885 | 10/2006 |
| JP | 2007-150556 | 6/2007 |
| JP | 2007-259060 | 10/2007 |
| JP | 2007-274172 | 10/2007 |
| JP | 2008-060916 | 3/2008 |
| JP | 2008-118565 | 5/2008 |

* cited by examiner

*Primary Examiner* — Gabriel Garcia
(74) *Attorney, Agent, or Firm* — Edwards Wildman Palmer LLP; David G. Conlin; Steven M. Jensen

(57) ABSTRACT

An image forming apparatus is provided with a display control portion for displaying a preview image of image data to be printed, and an original bundle-based processing mode is selectable by an operation portion. The display control portion, in the case of displaying a preview image in the original bundle-based processing mode, generates a thumbnail image, from image data read at each subjob, by reducing image data of a top page, and displays a thumbnail image corresponding to each generated subjob arranged as a preview image on a display portion. In addition, for changing a setting, the display control portion, in the case of displaying a preview image in the original bundle-based processing mode, displays a change key for changing only print conditions of a bundle of originals being displayed as a preview image to be selectable on the display portion by the operation portion.

12 Claims, 19 Drawing Sheets

IMAGE FORMING APPARATUS AND METHOD FOR DISPLAYING PREVIEW IMAGE OF TOP PAGE OF MULTIPLE SUB-JOBS OF A PRINT JOB

CROSS-NOTING PARAGRAPH

This non-provisional application claims priority under 35 U.S.C. §119(a) on Patent Application No. 2008-288980 filed in Japan on Nov. 11, 2008 and Patent Application No. 2008-291950 filed in Japan on Nov. 14, 2008, the entire contents of which are hereby incorporated herein by reference.

FIELD OF THE INVENTION

The present invention relates to an image forming apparatus capable of displaying a preview of image data before outputting, and a preview display method.

BACKGROUND OF THE INVENTION

There is a demand that a plurality of bundles of originals are printed in different duplicating (copying) conditions and handled as one job. Japanese Laid-Open Patent Publication No. 2005-134798 discloses an image processing apparatus which has a build job mode capable of satisfying such demand. The build job mode (an original bundle-based processing mode) enables a first bundle of originals to be copied in a black and white mode, a second bundle of originals to be copied in a color mode, and the both to be bound together to be finished as one printed document. Such processing is able to reduce the cost of copying than a case where all bundles of originals are printed in color. Moreover, it is able to eliminate user's labor of printing each in different image forming conditions and binding the finished printed document together by hand.

On the other hand, conventionally, some image forming apparatuses, such as multi-functional peripherals, include a function of displaying image data as a preview on a display portion before copying or printing thereof is executed. With the preview, a user is able to confirm a print status in advance, thus a wrong setting is possible to be reset before printing is performed and, therefore, it is possible to eliminate waste of resources, and labor of redoing.

Note that, conventionally, there is proposed an electronic filing system which manages an electronic document as image data read by a scanner or the like. Japanese Laid-Open Patent Publication No. 2005-275836 discloses a technology to display in line thumbnails which are reduced top pages of each file in a display portion in such an electronic filing system. Compared to a method for displaying a filing list consisting of file names, such thumbnail display improves recognizability of file contents and allows a user to easily select a file.

The preview function above is, however, to view a print status of scanned originals from the beginning in order and to confirm only the first and last image data by depressing a button set to view the first or the last.

Furthermore, although the original bundle-based as disclosed in Japanese Laid-Open Patent Publication No. 2005-134798 offers the above-mentioned convenience, all setting about a plurality of bundles of originals are required to be correct so as to obtain a satisfactory printed document, and even one failure requires an entire redoing, as a result, resources are wasted and it takes much time for redoing. Accordingly, in the original bundle-based processing mode, a method enabling easy confirmation of setting and change of setting is desired.

In the original bundle-based processing mode, a user may confirm that the setting is correct and start printing only by viewing all top images of each bundle of originals, but even when the preview function above is applied to an image forming apparatus with the original bundle-based processing mode mounted, setting confirmation may not be so easy in such a way. That is, when a user desires to view a preview of a bundle of originals in the middle, viewing preview pages sequentially thereto is required and, after viewing images sequentially from the beginning and confirming the bundle of originals to switch to the next, confirmation that the setting is correct is possible. Accordingly, a preview display method enabling an easy confirmation of setting in the original bundle-based processing mode is desired.

Furthermore, the technology to arrange thumbnail images which are reduced top pages in a file, as described in Japanese Laid-Open Patent Publication No. 2005-275836, is only used for selecting the file. Actually, since subjobs of each bundle of originals are collected and handled as one job, and image data of all bundles of originals (image data of each subjob) are collected and handled as one file in the original bundle-based processing mode, even when the technology as described in Japanese Laid-Open Patent Publication No. 2005-275836 is applied to the preview display means, only a thumbnail image of the very first page in the file (that is a top page of the first bundle of originals) is displayed and top pages of other bundles of originals are not arranged and displayed.

Furthermore, the preview function above is able to be reset only when a preview image being displayed does not correspond to a user's need, and when the preview function is applied in the original bundle-based processing mode, in which print conditions are set for each bundle of originals respectively (that is, there are a plurality of print conditions), and resetting is executed, the print conditions for all bundles of originals is reset.

In this way, in the original bundle-based processing mode, a setting change of print conditions of a bundle of originals, print conditions of which is desired to change is required. In contrast only applying the conventional preview display method results in a change of all the setting (common settings in all the bundles of originals, that is the overall print conditions) when displaying a preview. In this way, a method for resetting effectively in the original bundle-based processing mode is also desired.

SUMMARY OF THE INVENTION

An object of the present invention is to provide an image forming apparatus, in which a setting of each subjob is able to be easily confirmed, when a read original is displayed for previewing in an original bundle-based processing mode, which handles a plurality of subjobs as one job, and a preview display method thereof.

Furthermore, another object of the present invention is to provide an image forming apparatus, in which a setting of each subjob is able to be easily changed, when a read original is displayed for previewing in an original bundle-based processing mode, which handles a plurality of subjobs as one job, and a preview display method thereof.

To achieve the above-mentioned objects, the present invention includes each technological means as follows.

A first technical means of the present invention is an image forming apparatus provided with an operation portion, a display portion, and a display control portion for displaying a preview image of image data to be printed on the display portion, wherein an original bundle-based processing mode is selectable by the operation portion in the image forming apparatus, the original bundle-based processing mode is a mode for executing a plurality of subjobs each corresponding to a plurality of bundles of originals that are objects of original reading, to each of which print conditions is set, as one print job, and when the preview image is displayed in the original bundle-based processing mode, the display control portion generates a thumbnail image by reducing image data of a top page from each image data read at each subjob and arranges the generated thumbnail image corresponding to each subjob as the preview image to be displayed on the display portion.

A second technical means of the present invention is the image forming apparatus as defined in the first technical means, wherein the display control portion displays each thumbnail image of a top page corresponding to each subjob so as to be selectable by the operation portion and, when one of the thumbnail images being displayed is selected by the operation portion, displays a top page, a next page thereof, or a final page of a bundle of originals corresponding to the selected thumbnail images as the preview image on the display portion.

A third technical means of the present invention is the image forming apparatus as defined in the second technical means, wherein the display control portion displays, together with image data of a top page of a bundle of originals corresponding to the selected thumbnail image, a page change key for displaying other pages of the bundle of originals so as to be selectable by the operation portion on the display portion.

A fourth technical means of the present invention is the image forming apparatus as defined in the first technical means, wherein the display control portion displays, together with a thumbnail image of a top page for each of the subjob, a change key for changing print conditions for each of the bundle of originals so as to be selectable by the operation portion on the display portion.

A fifth technical means of the present invention is a preview display method in an image forming apparatus provided with an operation portion, a display portion, and a display control portion for displaying a preview image of image data to be printed on the display portion, wherein an original bundle-based processing mode is selectable by the operation portion in the image forming apparatus and the original bundle-based processing mode is a mode for executing a plurality of subjobs each corresponding to a plurality of bundles of originals that are objects of original reading, to each of which print conditions is set, as one print job, and the preview display method, including: a step in which the operation portion receives a selection of the original bundle-based processing mode; a step in which the operation portion receives an operation to display the preview image; and a step in which, when displaying the preview image in the original bundle-based processing mode, the display control portion generates a thumbnail image by reducing image data of a top page from each image data read at each subjob and arranges the generated thumbnail image corresponding to each subjob as the preview image to be displayed on the display portion.

A sixth technical means of the present invention is the preview display method as defined in the fifth technical means, further including: a step in which the display control portion displays, together with a thumbnail image of a top page for each of the subjob, a change key for changing print conditions for each of the bundle of originals so as to be selectable by the operation portion on the display portion.

A seventh technical means of the present invention is an image forming apparatus provided with an operation portion, a display portion, a preview image generating portion for generating a preview image of image data to be printed, and a display control portion for displaying the preview image generated by the preview image generating portion on the display portion, wherein an original bundle-based processing mode is selectable by the operation portion in the image forming apparatus, the original bundle-based processing mode is a mode for executing a plurality of subjobs each corresponding to a plurality of bundles of originals that are objects of original reading, to each of which print conditions is set, as one print job, and when displaying the preview image in the original bundle-based processing mode, the display control portion displays a change key for changing only print conditions of a bundle of originals being displayed as the preview image so as to be selectable by the operation portion on the display portion.

An eighth technical means of the present invention is the image forming apparatus as defined in the seventh technical means, wherein, after selection of the change key, the preview image generating portion regenerates a preview image of image data only as to a subjob whose print conditions is changed by the operation portion, from changed print conditions, and when the preview image generating portion regenerates the preview image, the display control portion displays the regenerated preview image on the display portion.

A ninth technical means of the present invention is the image forming apparatus as defined in the seventh technical means, wherein, when displaying the preview image in the original bundle-based processing mode, the display control portion displays information showing what number bundle processed in the print job the current preview image belongs to, on the display portion.

A tenth technical means of the present invention is the image forming apparatus as defined in the seventh technical means, wherein, when displaying the preview image in the original bundle-based processing mode, the display control portion displays information showing what number sheet of an original in the print job the current preview image belongs to, on the display portion.

A eleventh technical means of the present invention is the image forming apparatus as defined in the seventh technical means, wherein, after selection of the change key, when the change requires another original reading as to a subjob whose print conditions is changed by the operation portion, the display control portion displays a notification to prompt another original reading of a bundle of originals corresponding to a subjob that is an object of change of print conditions, on the display portion.

A twelfth technical means of the present invention is a preview display method in an image forming apparatus provided with an operation portion, a display portion, a preview image generating portion for generating a preview image of image data to be printed, and a display control portion for displaying a preview image generated by the preview image generating portion on the display portion, wherein an original bundle-based processing mode is selectable by the operation portion in the image forming apparatus and the original bundle-based processing mode is a mode for executing a plurality of subjobs each corresponding to a plurality of bundles of originals that are objects of original reading, to each of which print conditions is set, as one print job, and the preview display method, including: a step in which the operation portion receives a selection of the original bundle-based processing mode; a step in which the operation portion receives an operation to display the preview image; and a step in which, when displaying the preview image in the original bundle-based processing mode, the display control portion displays a change key for changing only print conditions of a bundle of originals being displayed as the preview image so as to be selectable by the operation portion on the display portion; and a step in which the operation portion receives a selection of the change key, and after the reception, receives an operation to change print conditions as to a subjob of a bundle of originals being displayed as the preview image.

A thirteenth technical means of the present invention is the preview display method as defined in the twelfth technical means, further including: a step in which the preview image generating portion regenerates a preview image of image data only as to a subjob, to which an operation to change the print conditions is received, from changed printing conditions; and a step in which, when the preview image generating portion regenerates a preview image, the display control portion displays the regenerated preview image on the display portion.

PREFERRED EMBODIMENTS OF THE INVENTION

Now, a preferred embodiment of the present invention will hereinafter be described with reference to the drawings. An embodiment in which an image forming apparatus according to the present invention is applied to a digital multi-functional peripheral having a print function, a copy function, and a facsimile sending and receiving function, etc., will hereinafter be described specifically with reference to the drawings showing the embodiment.

<Apparatus Configuration>

Figure 1:
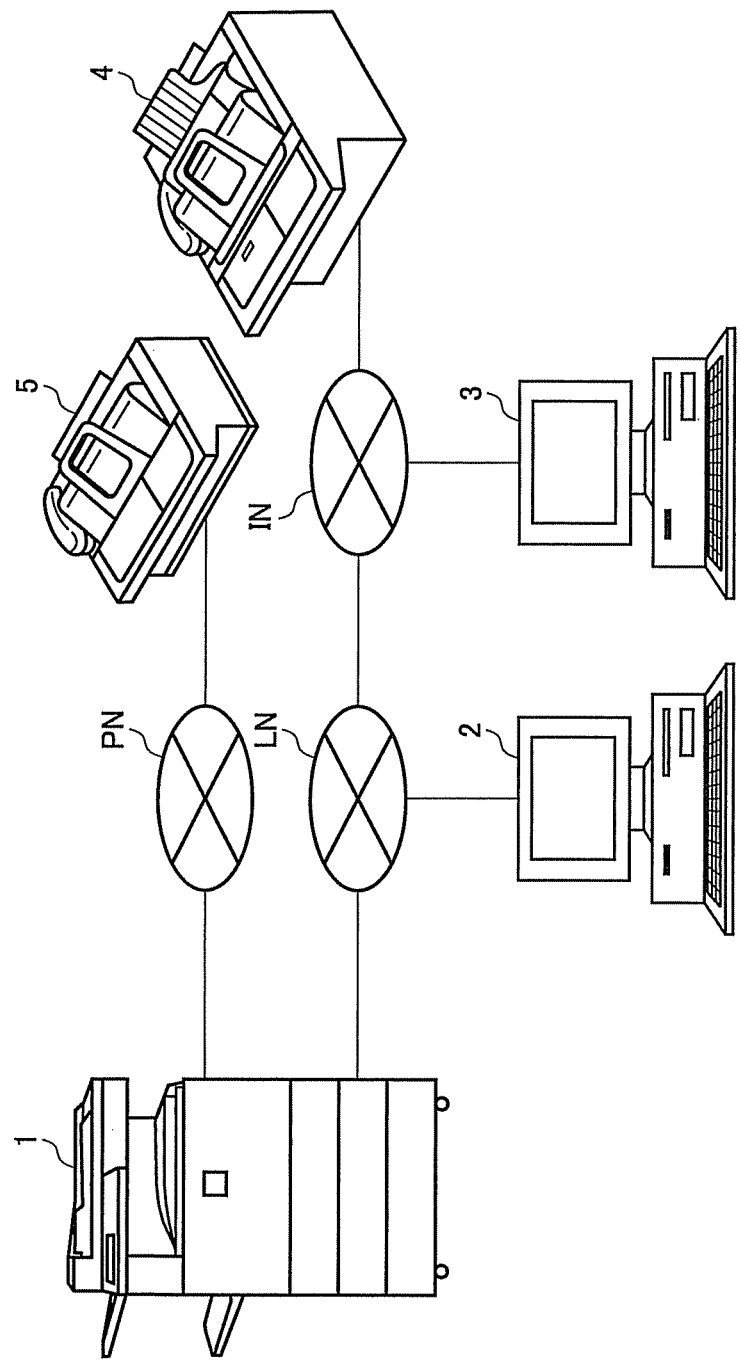
FIG. 1 is a schematic diagram for showing an exemplary configuration of an image processing system constructed by using a digital multi-functional peripheral as an example of an image forming apparatus according to an embodiment of the present invention.

FIG. 1 is a schematic diagram for showing an exemplary configuration of an image processing system constructed by using a digital multi-functional peripheral as an example of an image forming apparatus according to an embodiment of the present invention. In FIG. 1, 1 denotes a digital multi-functional peripheral, 2 and 3 denote external computers, 4 denotes an internet facsimile apparatus (internet FAX apparatus), and 5 denotes a facsimile apparatus.

The digital multi-functional peripheral 1 has a print function and a copy function, as well as a function of sending and receiving image data by facsimile (facsimile function) and/or a function of sending and receiving image data by internet FAX (internet FAX function). This digital multi-functional peripheral 1 is connected to various external devices through a communication network. For example, an external computer 2 such as a personal computer (PC) is connected to a communication network LN that is laid as a local communication network, and an external computer 3 and an internet FAX apparatus 4 are connected to an internet network IN that is connected through a gateway not shown in the figure, or the like. Further, an external facsimile apparatus 5 is connected through a public switched telephone network PN.

Figure 2:
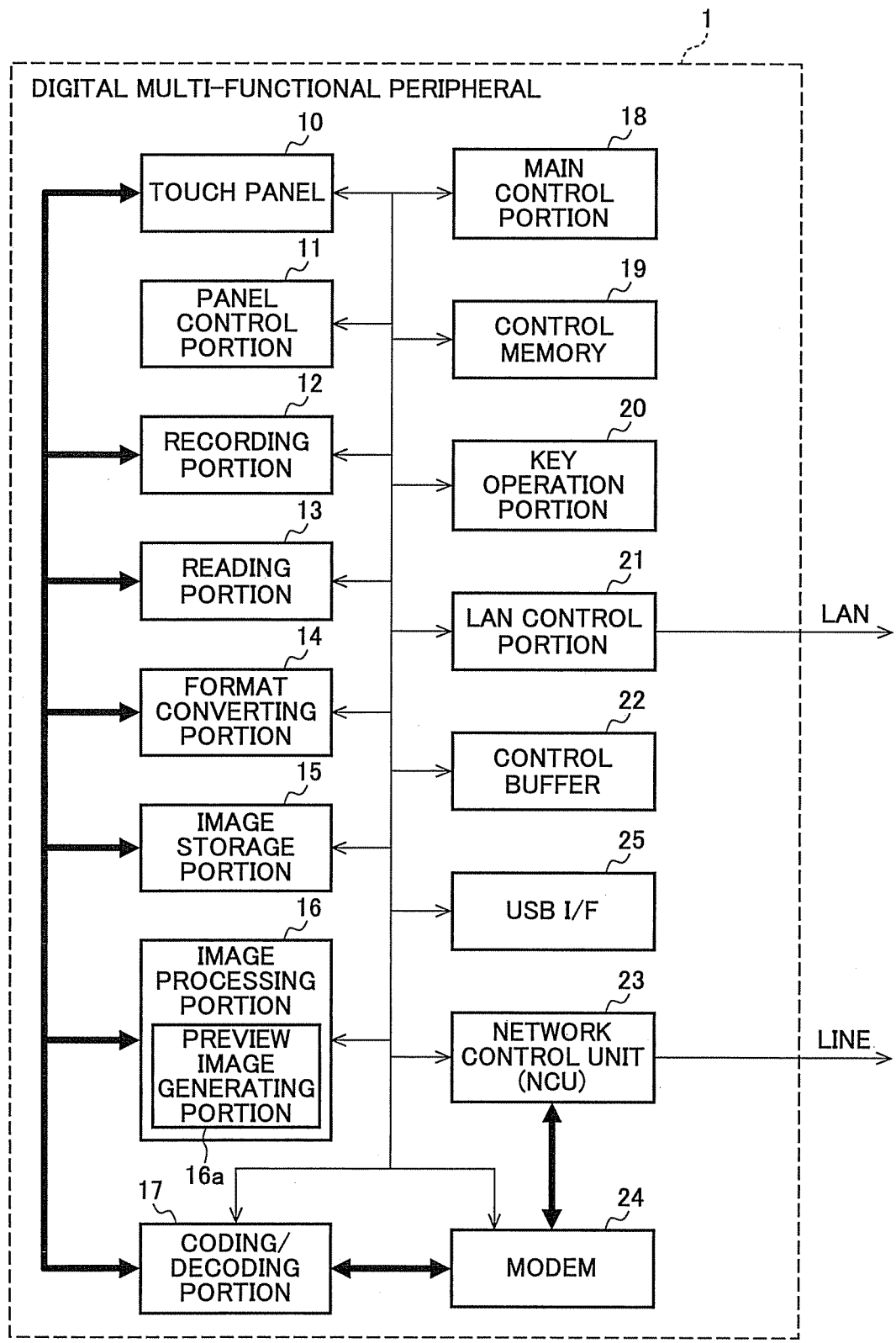
FIG. 2 is a schematic block diagram for showing an exemplary configuration of the digital multi-functional peripheral of FIG. 1.
Figure 3:
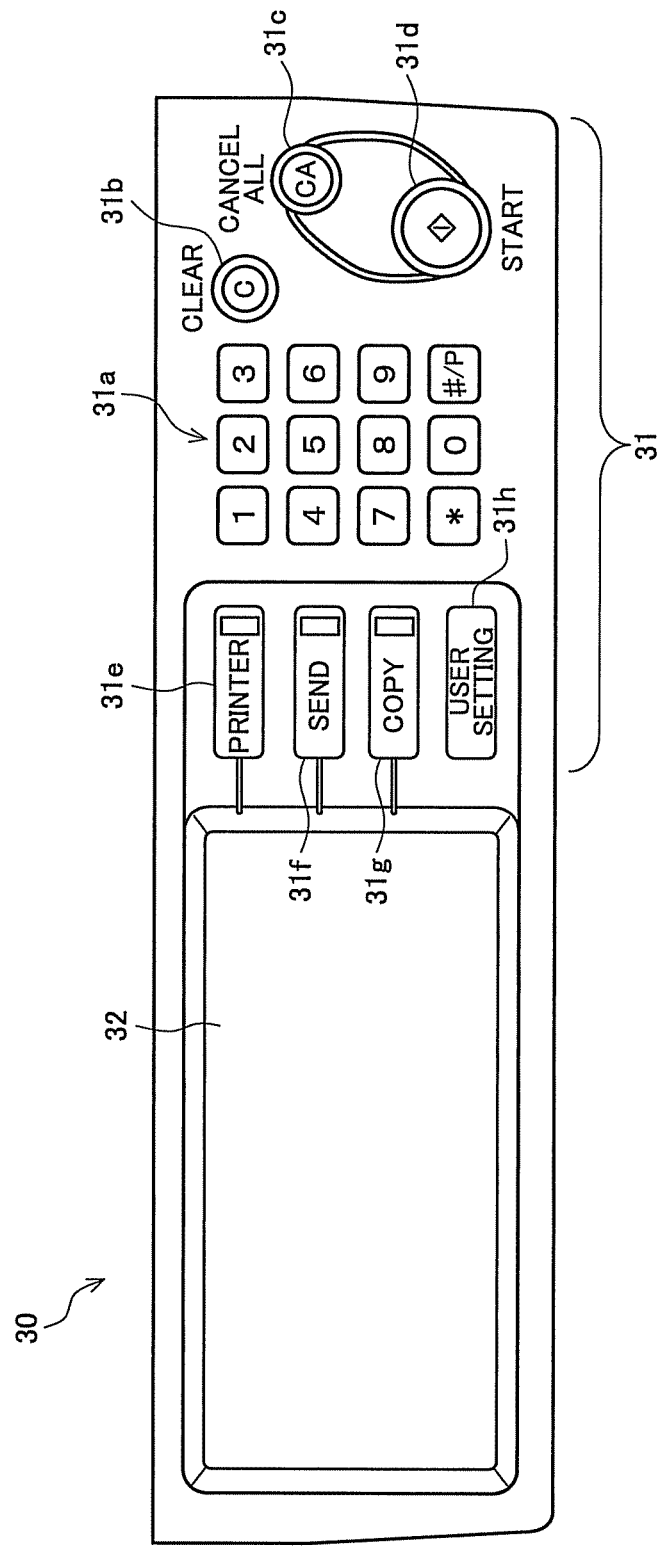
FIG. 3 is an external view for showing an example of a touch panel and a key operation portion in the digital multi-functional peripheral of FIG. 2.

Description will be given for a configuration and an operation of the digital multi-functional peripheral 1. FIG. 2 is a schematic block diagram for showing an exemplary configuration of the digital multi-functional peripheral of FIG. 1, and FIG. 3 is an external view for showing an example of a touch panel and a key operation portion of the digital multi-functional peripheral of FIG. 2.

The digital multi-functional peripheral 1 illustrated in FIG. 2 is provided with a touch panel 10, a panel control portion 11, a recording portion 12, a reading portion 13, a format converting portion 14, an image storage portion 15, an image processing portion 16, a coding/decoding portion 17, a main control portion 18, a control memory 19, a key operation portion 20, a LAN (Local Area Network) control portion 21, a control buffer 22, a network control unit (NCU) 23, a modem 24, and a USB (Universal Serial Bus) interface (I/F) 25. In addition, the digital multi-functional peripheral 1 may be provided with a post processing apparatus that performs punching, stapling, and the like and description will hereinafter be given with reference to an embodiment provided with the post processing apparatus.

The main control portion 18 is comprised of a CPU (Central Processing Unit), a DSP (Digital Signal Processor), or the like. The control memory 19 is comprised of a nonvolatile memory or the like, such as a ROM (Read Only Memory) or an EEPROM (Electrically Erasable and Programmable ROM). A program (firmware) and various setting data are stored in the control memory 19 so as to be readable from the main control portion 18. Among them, at least the various setting data is stored in a rewritable memory. The program and the various setting data may be stored in hard disc as an exemplary configuration of the image storage portion 15, which will be described below. The control buffer 22 is comprised of a volatile memory such as a RAM (Random Access Memory).

The above-described program is for the main control portion 18 to issue a command concerning generation and display of a preview image according to the present invention as will be described below, a command concerning generation, sending, receiving and the like of a facsimile image, an electronic mail, and the like, a command concerning original reading, a command concerning printing, a command concerning original reading and printing (that is, copying), and the like, to other parts. The program is written by the main control portion 18 on the control buffer 22 and executed with the control buffer 22 as a data region for temporary storage (work) by referring to various setting data described below as appropriate.

The reading portion 13 reads an original as a bitmap image of RGB (R: Red, G: Green, and B: Blue) with a predetermined resolution by a scanner using a CCD (Charge Coupled Device) and outputs the read RGB image data (dot image data) to the image processing portion 16. The image processing portion 16 is comprised of an ASIC (Application Specific Integrated Circuit) or the like, and applies various image processing to target image data. An example of the image processing will be described below. The ASIC may be incorporated with other parts such as the coding/decoding portion 17.

The image storage portion 15 is comprised of hard disc or the like, and stores image data that has been read by the reading portion 13 and has passed through the image processing portion 16, image data that has been received from outside through the LAN control portion 21, the NCU 23, etc., and the like. When image data is stored in the image storage portion 15, data that has been coded by the coding/decoding portion 17 may be also stored. Moreover, the image storage portion 15 may temporarily save intermediate data generated during image processing at the image processing portion 16.

The coding/decoding portion 17 compresses image data by coding and decodes (expands) the coded image data to original image data. For example, the coding/decoding portion 17 performs coding of image data read from an original, decoding of the coded data, decoding of coded image data received from outside, and the like. In the coding/decoding portion 17, coding systems corresponding to purposes are usable, including JPEG (Joint Photographic Experts Group) that is generally used in filing, and MH (Modified Huffman), MR (Modified READ) and MMR (Modified Modified READ) that are generally used in facsimile communication. As the coding system, MH is employable in IP facsimile communication, and JPEG and JBIG (Joint Bi-level Image Experts Group) as well as MH, MR, and MMR are employable in internet facsimile communication.

The format converting portion 14 converts read image data or image data received from outside into a predetermined file format such as a PDF (Portable Document Format), a GIF (Graphics Interchange Format), or a TIFF (Tag Image File Format).

The recording portion 12 is provided with a printer apparatus that employs a printing system such as an electrophotographic system or an inkjet system, and records (that is, prints) image data and the like stored in the image storage portion 15 on recording paper. The USB I/F 25 is an I/F for connecting to a USB device such as a USB memory, and outputs image data and the like after original reading that is stored in the image storage portion 15 to the USB device or reads a file from the USB device.

The modem 24 is comprised of a facsimile modem capable of facsimile communication, and is connected to a telephone line and is directly connected to the NCU 23. The NCU 23 is connected to the telephone line to control the line. That is, the NCU 23 is a hardware that performs an operation of closing and opening the line with an analogue public switched telephone network (PSTN), and connects the modem 24 to the public switched telephone network as the occasion demands. Such a configuration enables to send image data stored in the image storage portion 15 to outside by facsimile, to receive facsimile image data from the telephone line to store in the image storage portion 15, or to print by the recording portion 12 directly.

The LAN control portion 21 is connected to a LAN and performs communication of electronic mail data and communication of internet FAX via an internet. The internet FAX uses a LAN interface or the like to send and receive an electronic mail through a computer network such as a LAN.

The touch panel 10 or the key operation portion 20 receives an operation for selecting desired processing out of processing of reading an original, processing of sending and printing image data, etc., an operation for staring the processing, an operation for performing a setting that is necessary when each processing is executed (a selecting operation or an inputting operation), and the like. Various examples of the setting include a setting of the number of printed sheets in printing, a setting of color/monochrome, a setting of a reducing ratio or an enlarging ratio, a setting of punching or stapling, and a setting of destination information in sending a facsimile image or an electronic mail.

The key operation portion 20 is provided with a key group necessary for operations. The touch panel 10 has a display portion and an operation receiving portion such as a touch sensor. The touch panel 10 is subjected to display control and operation reception control by the panel control portion 11. That is, the panel control portion 11 performs the display control for the display portion and the operation reception control for the operation receiving portion in the touch panel 10.

On the display portion of the touch panel 10, a current operating state, setting information (for example, sending destination, etc.,) and the like are displayed. The display is realized when the panel control portion 11 performs control to display a GUI (Graphical User Interface) image. The GUI enables to change the display and an operation received position depending on a user operation. Each GUI and an image thereof may be stored so as to be readable in an internal memory of the panel control portion 11 or the control memory 19. In addition, as the display portion, display devices in various display systems including liquid crystal displays and organic EL (Electroluminescence) displays are employable.

The user operation received on the touch panel 10 is interpreted by the panel control portion 11 and is transmitted as an operation signal to the main control portion 18. The user operation received by the key operation portion 20 is interpreted by the key operation portion 20 itself and transmitted as an operation signal to the main control portion 18. The main control portion 18 issues a command in accordance with the operation signal obtained in this manner to other parts to cause the other parts to execute processing in accordance with the user operation. Note that, although description has been given with reference to the touch panel 10 in which the display device and the operation portion are integrated, only the display apparatus may be simply provided instead of the touch panel 10 and, in that case, where the user operation is received only by the key operation portion 20.

The touch panel 10 and the key operation portion 20 may be configured as an operation panel 30 as illustrated in FIG. 3, and the operation panel 30 is comprised of a key operation portion 31 (corresponding to the key operation portion 20) provided with various hardware keys and a touch panel 32 (corresponding to the touch panel 10) comprised of a liquid crystal display and a touch sensor. The present invention will hereinafter be described in detail with the touch panel 32 and the key operation portion 31 applied in the configuration of FIG. 1 instead of the touch panel 10 and the key operation portion 20.

The key operation portion 31 is provided with, as hardware keys, a numeric keypad 31*a* for inputting numeric values, a clear key 31*b* for clearing input set values, a cancel all key 31*c* for canceling all of various input settings, and a start key 31*d* for receiving instructions of start of copying, start of sending, etc., as well as function switch keys 31*e*, 31*f*, and 31*g* for switching a print function, a sending function and a copy function, and a system setting key 31*h* for receiving a setting by a user.

An exemplary operation in the digital multi-functional peripheral 1 having the above-described exemplary configuration will be described.

<Original Reading Operation>

An original reading operation is performed when image data of a read original is stored (filed) in the image storage portion 15, when image data of a read original is sent to outside, when image data of a read original is printed (that is, copied), and the like.

When a user operation to perform processing requiring original reading is received by the operation panel 30, the main control portion 18 gives an instruction to the reading portion 13, the image storage portion 15, the image processing portion 16, the coding/decoding portion 17, and the like to execute processing as will be described below.

The reading portion 13 optically reads an image of an original placed on a document platen or an automatic document feeder and provides the image processing portion 16 with RGB image data (bitmap data of RGB) as a result of reading. The image processing portion 16 executes various image processing (hereinafter, referred to as original image processing) such as A/D conversion, shading correction, and γ correction for the RGB image data. Here, the shading processing is processing to remove various distortions generated in an illumination system, an image focusing system, and an image sensing system of the reading portion 13.

As the original image processing, original determination processing and segmentation processing may be executed subsequently to the A/D conversion, the shading correction, and the γ correction. The original determination processing includes processing of determining a type of the original and processing of determining whether the original is a color original or a monochromatic original based on input image data (image data after the application of the γ correction in this case). Examples of the type of the original include a text original, a printed photograph original, and text and printed photograph original in combination thereof. The image processing portion 16 outputs a determination signal (hereinafter, referred to as original determination data) as a result of the original type determination processing and the monochromatic/color original determination processing. The segmentation processing is processing of determining to what kind of area each pixel of the input image data (image data after the application of the γ correction in this case) belongs, and an example thereof includes processing of determining to which area including a black text area, a color text area and a halftone area each pixel belongs. The image processing portion 16 outputs segmentation data as a result of the determination. Note that, the segmentation processing may be executed based on the result of the above-described original determination processing and monochromatic/color original determination processing.

The original determination data and the segmentation data are stored in the image storage portion 15 in association with corresponding image data (image data after the application of the original image processing). At this time, the original determination data and the segmentation data are coded by the coding/decoding portion 17 and each coded data is thereafter stored in the image storage portion 15 in association with the corresponding image data. Note that, although the coding in storing in the image storage portion 15 is not essential, description will be given assuming that the image data is stored in a state of being coded. This is also the same in operations other than the original reading operation.

<Printing Operation>

By the above-described original reading operation, processing up to filing of the image data of the read original is completed. Next, description will be given for a printing operation when the image data of the read original is printed (that is, when the original is copied). When the user operation to perform processing that requires printing is received by the operation panel 30, the main control portion 18 gives an instruction to the recording portion 12, the image storage portion 15, the image processing portion 16, the coding/decoding portion 17, and the like to execute processing as will be described below. Note that, the main control portion 18 also gives an instruction to the reading portion 13 (original reading instruction), for example, when a copy operation is performed.

The digital multi-functional peripheral 1 may be configured such that additional information such as a stamp, date (or date and time), and a page number to image data in printing are able to be added to image data, and description will hereinafter be given with reference to a configuration capable of such addition. When such an adding instruction is given, the main control portion 18 controls the image processing portion 16. It can be said that the additional information added to the image data is an additional image. The additional information is stored in the control memory 19 and is read out as the occasion demands. Of course, the additional information may be originally stored as data of the additional image.

In addition, it is recommendable that a plurality of additional information may be stored in the control memory 19 and additional setting information may be stored in the control memory 19. The additional setting information includes at least information showing a position to add to the image data (hereinafter, referred to as an adding position), and when a plurality of additional information is stored, information that indicates any of which is to be selected is also included. Moreover, when an instruction to execute the punching or the stapling by the post processing apparatus is given, the main control portion 18 also controls the post processing apparatus.

The coding/decoding portion 17 reads and decodes image data to be printed and original determination data and segmentation data corresponding thereto from the image storage portion 15, and gives the decoded image data to the image processing portion 16. The image processing portion 16 executes various image processing (hereinafter, referred to as image processing for printing) for the decoded image data (RGB image data). As will be schematically described below, examples of the image processing for printing include image quality adjustment processing, two-color processing, color correction processing, black generation and under color removal processing, spatial filter processing, scaling processing, output tone correction processing, and halftone generation processing. The black generation and under color removal processing, the spatial filter processing, and the halftone generation processing are processing in accordance with various areas indicated by the segmentation data.

As the image quality adjustment processing, a background is detected from the decoded image data to perform background removal. Moreover, as the image quality adjustment processing, RGB adjustment (color adjustment; entire color adjustment of redness or blueness), brightness adjustment, and vividness adjustment are also performed for the image data after the application of the background removal based on setting information set by a user from the operation panel 30. At this time, adjustment in accordance with an original type indicated by the original determination data may be performed.

As the color correction processing, CMY data having components of CMY (C: Cyan, M: Magenta, Y: Yellow) which are complementary colors of RGB is generated from the RGB data after the application of the image quality adjustment processing and the processing of enhancing color reproduction is performed. As the black generation and under color removal processing, black generation processing of generating black (K) data from the CMY data after the application of the color correction and under color removal processing of subtracting the K data obtained by the black generation from the original CMY data to generate new CMY data. As the spatial filter processing, enhancement processing or smoothing processing is performed for CMYK data which is data of the four colors. When a two-color mode for outputting the image data in two colors (for example, red and black) is selected, the two-color processing is performed. As the two-color processing, processing of converting the RGB data into CMY data that represents specified two colors (red and black in this case) is performed. In the case of the two-color mode, the black generation and under color removal processing is executed for the CMY data after the application of the two-color processing and the spatial filter processing is also executed, however, the color correction processing is not performed.

As the scaling processing, image enlarging processing or image reducing processing is performed for the CMYK data after the application of the spatial filter processing based on a printing copy ratio set by the user operation from the operation panel 30. The printing copy ratio is a copy ratio of a printed image for the image indicated by read and stored image data. Of course, the printing copy ratio is not limited to a copy ratio obtained by the user operation and is a copy ratio set as default when no operation is performed for the printing copy ratio. As the output tone correction processing, output γ correction processing of outputting to a recording medium such as recording paper is performed for the CMYK data. As the halftone generation processing, tone reproduction processing of outputting an image by error diffusion processing and dither processing is performed for the CMYK data after the application of the output tone correction processing. In the output tone correction processing and the halftone generation processing, the processing in accordance with an original type indicated by the original determination data may be performed, for example, including differentiating processing contents between a text area and other areas.

The CMYK data after the application of the halftone generation processing is provided to the recording portion 12. Description will be given for the case where additional information is added. There are a method for applying the scaling processing also to the additional information in accordance with a magnification of print data and a method for not applying the scaling processing to the additional information regardless of a magnification of print data. First, when the scaling processing is also performed for the additional information, the main control portion 18 reads the additional information and information showing an adding position, the main control portion 18 or the image processing portion 16 converts into image data as the occasion demands, and the image data of the additional information is provided to the image processing portion 16 before the scaling processing. Note that, the conversion is not necessary when additional image data is originally stored. Subsequently, the image processing portion 16 may combine the image data of the additional information and image data of an addition destination that is image data before the scaling processing at the above-described adding position.

When the scaling processing is not performed for the additional information, the main control portion 18 reads the additional information and information showing an adding position, and the main control portion 18 or the image processing portion 16 converts into image data as the occasion demands. In this example, CMYK data is obtained by the conversion. Note that, the conversion is not necessary when additional image data is originally stored. Subsequently, the image processing portion 16 may combine the image data of the additional information and image data of an addition destination that is image data after the application of the scaling processing (the above-described CMYK data to which the output tone correction processing or the halftone generation processing is applied) at the above-described adding position.

In either case, it is possible to output CMYK data after the application of the halftone generation processing with the additional information added thereto by the image processing portion 16. Note that, in the digital multi-functional peripheral 1, additional information and an adding position thereof can be set by the user using the operation panel 30 while performing a preview display described below.

The recording portion 12 receives the image data to which the image processing for printing has been given by the image processing portion 16 in this manner (CMYK image data in this example) and generates a hard copy (prints out) by an electrophotographic system, an inkjet system, or the like. Then, the post processing apparatus executes the punching or the stapling for printed sheets as the occasion demands. Note that, the data targeted for the printing operation described here is not limited to the image data read by the reading portion 13, and, for example, image data (image file) that has been previously transferred from an external recording medium, a PC connected through a network, or the like and stored in the image storage portion 15 is also applicable in the same manner. The printing operation for the image data that has been received by facsimile and stored in the image storage portion 15 will be described below.

<Preview Display Operation for Image Data to be Printed>

Next, description will be given for an operation of displaying a preview of image data stored in the image storage portion 15 as a result of original reading on the touch panel 32 before printing (preview display operation). The digital multi-functional peripheral 1 is configured so as to allow image data to be printed to be displayed for previewing (thumbnail display). The preview display operation is performed when the user operation to perform processing that requires the preview display is received by the operation panel 30. For example, the preview display operation is also performed when a setting is made such that a preview of the image data after the original reading is firstly displayed before executing printing.

The main control portion 18 gives an instruction to the image storage portion 15, the image processing portion 16, the coding/decoding portion 17, the panel control portion 11, and the like to execute processing as will be described below. Note that, the main control portion 18 also gives an instruction to the reading portion 13 (original reading instruction), for example, when an operation of copying an original is performed.

The coding/decoding portion 17 reads and decodes image data to be displayed for previewing and original determination data and segmentation data corresponding thereto from the image storage portion 15, and gives the decoded data to the image processing portion 16. The image processing portion 16 executes various image processing (hereinafter, referred to as image processing for previewing) for the decoded image data (RGB image data). As will be schematically described below, examples of the image processing for previewing include image quality adjustment processing, two-color processing, color correction processing, spatial filter processing, scaling processing, and output tone correction processing. The spatial filter processing and the output tone correction processing are processing in accordance with various areas indicated by the segmentation data.

The image quality adjustment processing here is the same as the image quality adjustment processing in the image processing for printing. As the color correction processing, processing of converting the image data after the application of the image quality adjustment processing (RGB data) into R'G'B' data based on display characteristics of the touch panel 32 is performed. As the spatial filter processing, enhancement processing or smoothing processing is performed for the R'G'B' data.

As the scaling processing, image enlarging processing/image reducing processing in accordance with the printing copy ratio is performed to R"G"B" data after the application of the spatial filter processing, and further processing to convert a pixel number of the R"G"B" data into a pixel number (display resolution) of the touch panel 32 is performed and the image enlarging processing or image reducing processing is performed based on a preview display magnification set by the user operation from the operation panel 30 at the same time. The preview display magnification is a fixed magnification, for example, such as twice or four times, and is a magnification of an image in the preview display. Of course, the preview display magnification is not limited to a preview display magnification obtained by the user operation and is a preview display magnification set as default when no operation is performed for the preview display magnification.

A preview image generating portion 16a provided in the image processing portion 16 generates an image for the preview display (preview image) mainly by such scaling processing for the preview display.

Description will be given for a preview image in a case where additional information is added. When image data of the object to output is output with additional information added thereto in the digital multi-functional peripheral 1, the panel control 11 controls to display an additional information image showing additional information. Accordingly, the preview image generating portion 16a generates such an additional information image and superimpose it on a preview image generated from the image data of the object to output to generate a preview image with an additional information image.

The additional information can be output together with image data to be printed by performing the scaling processing in accordance with a printing copy ratio and, furthermore, can be output by adding to the image data to be printed after that information is subjected to the scaling processing in accordance with a printing copy ratio. First, when the scaling processing is performed also to the additional information to output, the main control portion 18 reads the adding position of the additional information and the information showing the additional information (or a size of the additional information) and gives the position and the information to the image processing portion 16 before the scaling processing. Subsequently, the preview image generating portion 16a generates R'G'B' data of an additional information image showing the additional information from the additional information (or the size of the additional information), combines the generated data with image data of an addition destination that is the image data before the scaling processing is performed at the above-described adding position. Then, the image enlarging processing/image reducing processing in accordance with a printing copy ratio may be applied to the R'G'B data to which the additional information image has been added.

When the scaling processing is not performed to the additional information, the main control portion 18 reads the adding position of the additional information and the information showing the additional information (or a size of the additional information) and gives the position and the information to the image processing portion 16. Subsequently, the preview image generating portion 16a generates R'G'B' data of an additional information image showing the additional information from the additional information (or the size of additional information), combines the generated data with the R'G'B data after the application of the image enlarging processing/image reducing processing in accordance with a printing copy ratio at the above-described adding position, and performs processing to convert the number of pixel of the R'G'B' data to which the addition has been performed into the number of pixel (display resolution) of the touch panel 32, and at the same time, the image enlarging processing or the image reducing processing may be performed based on the preview display magnification set by the user operation from the operation panel 30.

Furthermore, when the punching or the stapling is applied in the post-processing apparatus, data of an image for showing post processing such as punching holes and stapling (for convenience, referred to as "an additional information image") may be output by being combined with a preview image generated from image data to be printed (and additional information image data of additional information) at a punching position or a stapling position. Such processing enables displaying an output state of a sheet on which an image is formed as the time of displaying a preview of the image data.

As the output tone correction processing, output γ correction processing is performed to R'G'B' data of the preview image with the additional information image added thereto to display the image data on the touch panel 32. In the output tone correction processing, processing may be performed in accordance with an original type indicated by the original determination data, for example, different processing is performed to a text area and other areas respectively.

The two-color processing is executed only when a two-color mode for outputting image data in two colors of red and black, for example, is selected. As the two-color processing, processing of converting the RGB data after the application of the image quality adjustment processing into CMY data that represents specified two colors (red and black in this case) is performed. The generated CMYK data is converted into R'G'B' data based on display characteristics of the touch panel 32 at the subsequent color correction processing.

R'G'B' data generated by the preview image generating portion 16a and subjected to the output tone correction processing is given to the touch panel 32. The panel control portion 11 performs a control for the touch panel 32 to display an image corresponding to the R"G"B' data by incorporating it in a GUI image and displays the GUI image on the touch panel 32. A user confirms an image displayed for previewing including an additional information image showing additional information or post processing, and determines whether to execute printing as it is or to cancel, whether to delete the additional information or to suspend the post processing, whether to execute changing of the adding position (or changing of the additional information) or changing of a post processing position, and is able to perform the operation awaiting to the results of the determination.

Note that, the data targeted for the preview display operation described here is not limited to the image data read by the reading portion 13, and, for example, image data (image file) that has been previously transferred from an external recording medium, a PC connected through a network, or the like and stored in the image storage portion 15 is also applicable in the same manner. The preview display operation for the image data that has been received by facsimile and stored in the image storage portion 15 will be described below.

<Supplementary on Original Reading, Preview Display and Printing>

Although the preview display operation is described separately from the printing operation, image data after the application of the output tone correction processing (CMYK data) may be, first as the printing operation, converted into R'G'B' data based on display characteristics of the touch panel 32, and the conversion processing corresponding to the number of pixels (display resolution) of the touch panel 32 and the scaling processing in accordance with a reducing/enlarging ratio in displaying a preview may be performed to display on the touch panel 32. It is useful, since the printing operation is completed to a certain degree and the printing operation can thereby be quickly completed after the preview display, for example, in a case where setting is made such that the preview display is previously performed when the copying operation is performed. Such processing is also applicable to the case of displaying a preview with an additional information image showing additional information and post processing added thereto.

In addition, an example in which the coded image data, the original classification data and the segmentation data are stored in the image storage portion 15 in association with one another has been taken as the original reading operation, and the printing operation and the preview display operation have been also described based on the example. As an alternative method thereof, coding may be performed only for the image data read by the reading portion 13, and the coded image data may be temporarily stored in the image storage portion 15. In this case, it may be configured such that the image processing portion 16 applies the original type determination processing and the segmentation processing to the image data that has been read from the image storage portion 15 and decoded by the coding/decoding portion 17 in the printing operation and the preview display operation. In addition, such an alternative method is also applicable in sending image data such as facsimile sending or internet FAX sending, which will be described below.

<Printing Operation for Image Data Received by Facsimile>

Next, description will be given for the printing operation for image data received by facsimile communication. When detecting a facsimile communication request by the modem 24, the main control portion 18 gives an instruction to the recording portion 12, the image storage portion 15, the image processing portion 16, the NCU 23, the modem 24, and the like to execute processing as will be described below.

First, the modem 24 and the NCU 23 sequentially receive image data (compressed image data) sent from a sending source according to the communication procedure and expand the received compressed image data, and execute rotating processing (processing of rotating a sending direction), resolution conversion processing, and the like as necessary to provide to the image processing portion 16 at the same time.

Since the image data received by facsimile communication is black-and-white binary data, particular processing is not performed for the image data (K data) to which processing such as expansion has been given in the image processing portion 16, and the image data is directly given to the recording portion 12. The recording portion 12 receives the image data and executes printing by an electrophotographic system, an inkjet system, or the like. It is also possible to perform printing for the image data received by facsimile communication after adding the above-described additional information thereto.

Description has been given for the facsimile reception of the monochromatic image, but when a color facsimile image (RGB data) is received, the image processing portion 16 may execute the image processing for facsimile reception described here for the RGB data.

<Preview Display Operation of Image Data Received by Facsimile>

Description will be given briefly for the preview display operation of image data received by facsimile communication based on the printing operation of the same image data. The preview display operation is performed when a previous setting or a user operation is made such that printing is executed after the image data received is previously confirmed. In the preview display operation, the image processing portion 16 combines, in the case of adding additional information or applying post processing, the image data of an additional information image showing the additional information or the post processing with the image data to which the processing such as expansion has been applied, and after that further performs the conversion processing in accordance with the number of pixels (display resolution) of the touch panel 32 and the scaling processing in accordance with a reducing/ enlarging ratio at the time of displaying a preview, and then the image data after the application of the scaling processing is displaced on the touch panel 32. The user confirms the image displayed for previewing, determines whether to execute or discard printing, contents and necessity of the additional information and the post processing, and is able to perform printing or discarding operation, or the operation to change the contents of the additional information or the post processing.

<Facsimile Sending Operation>

Next, description will be given for a sending operation when image data of a read original is sent by facsimile. The facsimile image data is sent to destination (sending destination) information set by the user operation from the touch panel 32 or the key operation portion 31. The destination information (telephone number in this example) is stored in the control memory 19 and is read out as necessary. The destination information is generally stored as address book data so that information of each of a plurality of destinations is viewable and selectable, or is directly input before sending.

When the user operation to execute the facsimile sending is received by the operation panel 30, the main control portion 18 gives an instruction to the image storage portion 15, the image processing portion 16, the coding/decoding portion 17, the NCU 23, the modem 24, and the like to execute processing as will be described below. Note that, the main control portion 18 also gives an instruction to the reading portion 13 (original reading instruction), for example, when the operation to send the original by facsimile is performed. Note that, it is also possible for the main control portion 18 to select image data to be sent and start to send it by facsimile as it displays a preview of the image data stored in the image storage portion 15.

The coding/decoding portion 17 reads and decodes image data to be printed and original determination data and segmentation data corresponding thereto from the image storage portion 15 and gives the coded data to the image processing portion 16. The image processing portion 16 executes various image processing (hereinafter, referred to as image processing for facsimile sending) for the decoded image data (RGB image data). As will be schematically described below, examples of the image processing for facsimile sending include image quality adjustment processing, spatial filter processing, scaling processing, output tone correction processing, and halftone generation processing. The spatial filter processing and the halftone generation processing may be processing in accordance with various areas indicated by the segmentation data, while it is possible not to use the segmentation data. Further, in the original reading operation following the facsimile sending, the segmentation processing for the read image data and coding and storage of the segmentation data may not be executed.

As the image quality adjustment processing, the decoded image data is converted into K data using a matrix coefficient. In this case, a matrix coefficient in accordance with an original type indicated by the original determination data may be used. As the spatial filter processing, enhancement processing or smoothing processing is performed for the K data. As the scaling processing, image enlarging processing or image reducing processing in accordance with a sending resolution set by the operation panel 30 or a default-set sending resolution is performed for the K data spatial filter processing. As the output tone correction processing, output γ correction processing for the purpose of outputting to a recording medium such as recording paper at a sending destination, for example, is performed to the K data after the application of the scaling processing. Actually, it is possible to perform output γ correction to a general device but not output γ correction that takes a device of the sending destination into consideration. As the halftone generation processing, binarization by error diffusion processing, for example, is performed for the K data after the application of the output tone correction processing. In the output tone correction processing and the halftone generation processing, processing in accordance with an original type indicated by the original determination data may be performed.

Description has been given for the facsimile sending of the monochromatic image, but when a color image is sent by facsimile, the image processing portion 16 may perform processing of converting the decoded image data into L*a*b* data for color transmission using a matrix coefficient as the image quality adjustment processing in the above-described image processing for facsimile sending so that the subsequent processing is performed for the L*a*b* data.

The rotating processing is applied to the image data after the application of the halftone generation processing as the occasion demands and the image data after the application of the halftone generation processing is compressed and coded by the coding/decoding portion 17 in a compression format at the facsimile sending, and then temporarily saved in the image storage portion 15. The modem 24 performs sending procedure to a sending destination set through the NCU 23, and at the time when communication with the sending destination is established (at the time ready for sending), the coded K data which is temporarily saved is read out and sequentially sent to the sending destination through the public line network after the application of necessary processing such as changing of the compression format.

In addition, the digital multi-functional peripheral 1 may be configured to be capable of sending image data to be sent with additional information added thereto. When sending image data to the outside like in this example, it is also possible to add sending source information (transmission source information) in addition to a stamp, date (date and time), and a page number as the additional information. In this case, the sending source information to be added in sending image data may include any one or more pieces of information of a name of a sender, information of a telephone number of a sending source, and information of an electronic mail address of a sending source. Moreover, information of a sending destination (information of a destination) and the like may be added as the additional information in sending image data.

In the case of the facsimile sending with additional information added, combining processing may be performed as follows. The main control portion 18 reads additional information and information showing an adding position, the main control portion 18 or the image processing portion 16 converts the information into image data, and the image processing portion 16 combines the converted image data (image data of additional information) and image data of an addition destination that is image data after the application of the scaling processing at the above-described adding position. In the digital multi-functional peripheral 1, the position at which the image data of the additional information is added is possibly set by a user from the operation panel 30 as the user performs the preview display as will be described below. The combined image data is sent to the sending destination after the above-described output tone correction processing, rotating processing, and compression processing, etc., are applied to it.

<Preview Display Operation for Image Data to be Sent by Facsimile>

The digital multi-functional peripheral 1 is configured so as to be possible to display image data to be sent by facsimile sending or the like for previewing. The preview display operation is performed, for example, when the previous setting or the user operation to execute sending after the confirmation of the image data before sending in advance is performed. Description will be given for the preview display operation for the image data to be sent by facsimile based on the facsimile sending operation for the same image data. In the preview display operation, the main control portion 18 also gives an instruction to the panel control portion 11.

In the preview display operation, it is preferable for the image processing portion 16 to perform the same processing as that in the facsimile sending up to the image quality adjustment processing, the spatial filter processing (and scaling processing), execute preview image generation processing by the preview image generating portion 16a and perform, as the output tone correction processing, the output γ correction processing to display image data. As the preview image generation processing, the preview image generating portion 16a performs, to image data after the application of the image enlarging processing or the image reducing processing in accordance with a sending resolution, the conversion processing in accordance with the number of pixels (display resolution) of the touch panel 32 and the scaling processing in accordance with a reducing/enlarging ratio in displaying a preview, so that data for the preview image is generated. Note that, in the preview display operation, the spatial filter processing may not be executed and the halftone generation processing is not executed.

R'G'B' data generated by the preview image generating portion 16a and dealt with by means of the output tone correction processing is given to the touch panel 32. The panel control portion 11 performs control for the touch panel 32 to display an image corresponding to the R'G'B' data in a state of being incorporated in a GUI image and displays the GUI image on the touch panel 32.

Description will be given for a preview image in the case of sending it with additional information added thereto. The additional information is output by adding it to the image data subjected to the scaling processing in accordance with a sending resolution. More specifically, the main control portion 18 reads an adding position of the additional information and the additional information, and gives the position and the additional information to the image processing portion 16. Subsequently, the preview image generating portion 16a generates R'G'B' data of an additional information image showing additional information from the additional information and may combine the generated R'G'B' with the R'G'B' data after the application of the image enlarging processing or the image reducing processing in accordance with a sending resolution at the above-described adding position. Note that, in sending image data such as facsimile sending, the post processing is not particularly considered.

The image data with the additional information image combined in this manner is, after the application of the output tone correction processing (output γ correction processing to display image data) in the above-described preview display, incorporated by the panel control portion 11 in a GUI image and displayed on the touch panel 32. The user confirms the image displayed for previewing including the additional information image, determines whether to execute or cancel the facsimile sending, whether to delete the additional information, whether to execute changing of the adding position (or changing of the additional information), or the like, and is able to perform the operation according to the results of the determination.

<Sending Operation for Image Data Via Internet>

Next, description will be given for a sending operation when image data of a read original is sent by an electronic mail or internet FAX via the internet. Such image data to be sent via the internet is also sent to sending destination information (electronic mail address in this example) set by the user operation from the touch panel 32 or the key operation portion 31 and stored in the control memory 19.

When the user operation concerning the sending via the internet is received by the operation panel 30, the main control portion 18 gives an instruction to the format converting portion 14, the image storage portion 15, the image processing portion 16, the coding/decoding portion 17, the LAN control portion 21, and the like to execute sending processing via the internet as will be described below. Note that, the main control portion 18 also gives an instruction to the reading portion 13 (original reading instruction), for example, when an operation to send an original via the Internet is performed.

The coding/decoding portion 17 reads and decodes image data to be printed and original determination data and segmentation data corresponding thereto from the image storage portion 15, and gives the decoded data to the image processing portion 16. The image processing portion 16 executes various image processing (hereinafter, referred to as image processing for internet sending) to the decoded image data (RGB image data). Examples of the image processing for internet sending include the image quality adjustment processing, the spatial filter processing, the scaling processing, the output tone correction processing, and the halftone generation processing, which have been described in the image processing for facsimile sending.

Moreover, the image processing in the case of color image sending is also the same as the image processing for facsimile sending, and in the image processing for internet sending, the image processing portion 16 may perform processing of converting the decoded image data into L*a*b* data for color transmission using a matrix coefficient as the image quality adjustment processing so that the subsequent processing is performed for the L*a*b* data.

The coding/decoding portion 17 codes (compresses) the image data after the application of the image processing for internet sending to obtain compressed files. The compression is performed in the unit of a single page of the original. Subsequently, the format converting portion 14 converts the compressed files into a single file and the file is attached to a multipart mail according to MIME (Multipurpose Internet Mail Extension), for example. By the processing so far, the read image data is converted into a format of an electronic mail. The electronic mail is sent to a sending destination via the internet using a mail transfer protocol such as an SMTP (Simple Mail Transfer Protocol) through a LAN interface by the LAN control portion 21.

In the case of the internet facsimile sending, the coding/decoding portion 17 may perform the compression in a compression format only for facsimile such as MH, for example, and the format converting portion 14 may convert the obtained compressed files in the unit of a page, for example, into a single TIFF file. In the case of sending just by attaching to the electronic mail as an attached file (in the case of sending by so-called scan to e-mail), the coding/decoding portion 17 may perform the compression in a compression format such as JPEG, for example, and the format converting portion 14 may convert the obtained compressed files in the unit of a page into a single PDF file, for example.

In addition, even when image data to be sent is image data sent via the internet, the digital multi-functional peripheral 1 is capable of sending the image data with additional information added thereto in the same manner as the case of the facsimile sending image data. As the additional information adding processing, the combining processing described in the facsimile sending may be executed, and the image data is subjected to the output tone correction processing, the compression processing, the format conversion processing, and the like described above and thereafter sent to an address of a sending destination as an electronic mail.

<Preview Display Operation for Image Data to be Sent Via Internet>

As mentioned in the description for the preview display in the facsimile sending, the digital multi-functional peripheral 1 is capable of being configured so that a preview of image data to be sent via the internet is also able to be displayed on the touch panel 32.

In the preview display operation, as mentioned in the description for the preview display in the facsimile sending, it is preferable for the image processing portion 16 to perform the same processing as the image processing for the internet sending up to the image quality adjustment processing, the spatial filtering processing (and the scaling processing), execute the preview image generation processing by the preview image generating portion 16a and perform, as the output tone correction processing, the output γ correction processing to display image data. The R'G'B' data generated by the preview image generating portion 16a and subjected to the output tone correction processing is given to the touch panel 32, is incorporated by the panel control portion 11 in a GUI image and is displayed on the touch panel 32. Further, addition of the additional information image is also possible to be described by using the description for the preview display in the facsimile sending.

<Description for Preview Display Before Printing Image Data According to the Present Invention>

As has been described hereinbefore the preview display operation before printing in copying, the digital multi-functional peripheral 1 according to the present invention has the preview image generating portion 16a that reads image data that is read by a scanner illustrated as the reading portion 13 to be the object of printing from the image storage portion 15 and generates a preview image thereof. The preview image generated by the preview image generating portion 16a is sent to the touch panel 32 by the control of the main control portion 18, is controlled by the panel control portion 11 to be displayed in a state of being incorporated in a GUI image, and is displayed on the touch panel 32. In this manner, the touch panel 32 is an example of the display portion for displaying a preview of the image data that is the object of printing.

Then, in the digital multi-functional peripheral 1 according to the present invention, an original bundle-based processing mode is possible to be selected by an operation portion. The operation portion is able to be illustrated as the touch panel 32, or the touch panel 32 and the key operation portion 31.

The original bundle-based processing mode, here, is a mode for executing a plurality of subjobs, to each of which print conditions is set, as one print job. The plurality of these subjobs are subjobs that correspond to each of a plurality of bundles of originals that are the objects of original reading. Then, before executing printing, image data corresponding to these subjobs is collected as one file and stored in the image storage portion 15 temporarily, and read by the recording portion 12 in executing printing. That is, one file is generated by one print job. In this manner, in the original bundle-based processing mode, original reading processing is performed for each bundle of originals for obtaining subjob data of each bundle of originals, and one file is generated based on print conditions set for each bundle of originals, and print processing is executed.

Then, as a main characteristic of the present invention, a display control portion, described below, is provided. The display control portion generates, when displaying a preview image in the original bundle-based processing mode (that is, when the original bundle-based processing mode is selected and a setting is made to display a preview image), a thumbnail image by reducing image data of a top page from each image data read at each subjob, and arranges a generated thumbnail image corresponding to each subjob as a preview image to be displayed on a display portion (illustrated as the touch panel 32).

Thus, a thumbnail image displayed for previewing in the present invention is a reduced image of image data of a top page of a bundle of originals, and is generated in the same number as the bundle of originals. Note that, whether or not all the generated thumbnail images are to be displayed is optionally decided since there is also a concern about a display area.

Out of the processing in the display control portion described above, processing from generation of thumbnail images to generation of a preview image by arranging the thumbnail images may be executed by the preview image generating portion 16a, and subsequent processing may be executed by the panel control portion 11, for example. That is, when displaying a preview in the original bundle-based processing mode, a preview image generating portion 46a generates a thumbnail image that is a reduced image data of a top page of each subjob (that is, a top page of each bundle of originals), arranges these as a preview image and provides to the panel control portion 11, and the panel control portion 11 may perform a control for the touch panel 32 to display the preview image in a state of being incorporated in a screen of the touch panel 32 to display.

By such a configuration, the present invention is able to easily confirm a setting of each subjob, when displaying a preview of a read original in the original bundle-based processing mode, which handles a plurality of subjobs as one job.

Furthermore, as described above, adding additional information to image data to be printed and outputting it, or printing image data to be printed on recording paper and applying post processing to the recording paper may be possible. In such a case, in the digital multi-functional peripheral 1, the panel control portion 11 performs a control to display an additional information image showing additional information or post processing on the touch panel 32 based on the control of the main control portion 18. Thus, the preview image generating portion 16a generates such an additional information image and synthesizes with a preview image generated by the image data to be printed (corresponding to the above-described thumbnail image), to generate a preview image with an additional information image added thereto. A synthesizing position is a position of the preview image corresponding to an adding position of additional information or a position at which the post processing is applied. In this manner, when outputting image data to be printed with additional information (a stamp, date, page number, and the like) added thereto and when outputting recording medium at which post processing such as punching or stapling is applied, a final state of image formation is possible to be confirmed.

Note that, although description has been given for the preview display before printing, as description has been given for the preview display operation in facsimile sending or in transmitting image data through the internet, not only for the image data to be printed, but also for the image data to be transmitted (that is, the image data that is the object of the output other than printing), similar processing is possible to be performed. In this case, the original bundle-based processing mode is a mode to execute a plurality of subjobs that correspond to each of plurality of bundles of originals that are the objects of original reading, and to each of which transmitting conditions is set, as one transmitting job.

Additionally, although description has been given assuming an original reading, image data to be printed or transmitted is not limited to image data input from a scanner apparatus illustrated as the reading portion 13, but may be image data input from an attachable/detachable storage apparatus illustrated as the USB memory connected to the USB I/F 25, image data input from a communication line illustrated as the LAN or the line, or image data read from a storage apparatus illustrated as the image storage portion 15. In this case, an original bundle-based processing mode is a mode to execute a plurality of subjobs that correspond to each of plurality of bundles to be output, and to each of which an output condition is set, as one output job.

<Specific Example 1 of Preview Display>

Referring to FIGS. 4 to 13, description will hereinafter be given for the flow of a preview display in an original bundle-based processing mode, with specific examples thereof. Although printing in copying is illustrated mainly in the example below, it is also applicable such as in printing in facsimile receiving, in printing of image data read by a USB memory or the like, in facsimile sending, or in internet FAX sending and receiving.

Figure 4:
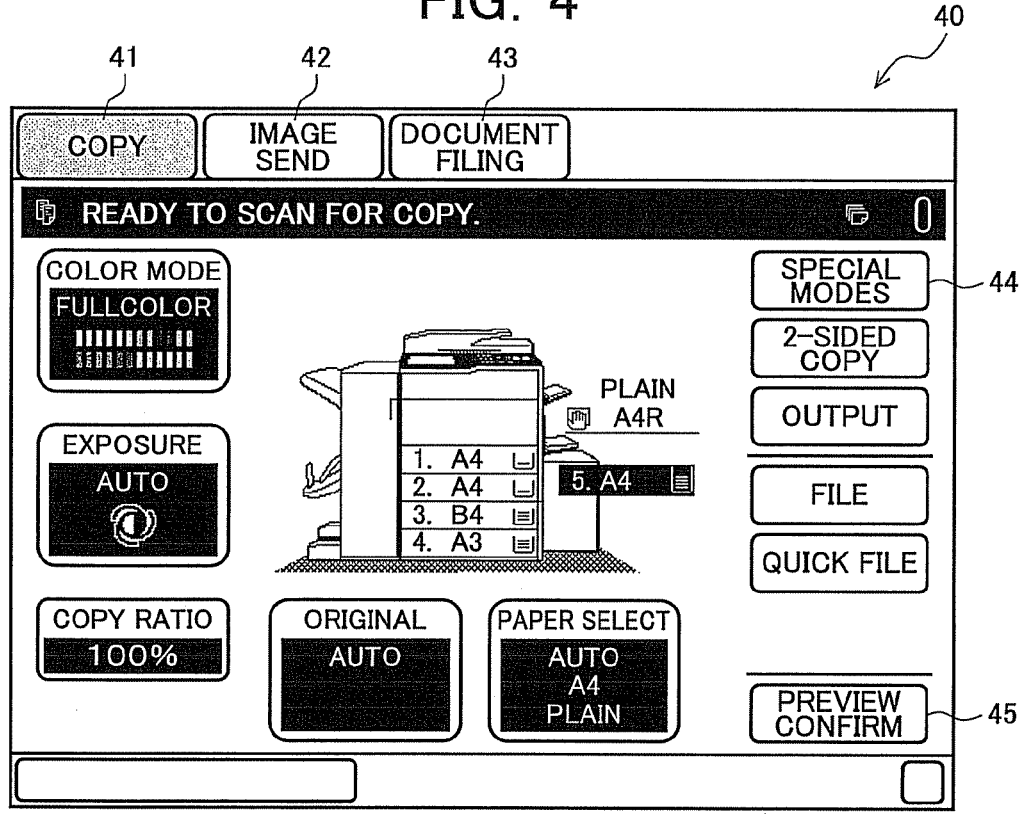
FIG. 4 is a diagram for showing an example of a standard screen of the digital multi-functional peripheral explained in FIGS. 2 and 3.

FIG. 4 is a diagram for showing an example of a standard screen of the digital multi-functional peripheral explained in FIGS. 2 and 3. FIG. 4 shows an example of a GUI image (referred to as a GUI image 40) displayed on the touch panel 32 in the digital multi-functional peripheral 1 as the standard screen. The GUI image 40 of the standard screen is displayed on the touch panel 32 when a power source of the digital multi-functional peripheral 1 is turned on or reset. In the GUI image 40, a copy mode selection key 41, an image send mode selection key 42, and a document filing mode selection key 43 are displayed to select an operation mode of the digital multi-functional peripheral 1, and the GUI image 40 shows a state where the copy mode is selected.

In the copy mode, various condition settings are possible to perform a copy. For example, a 2-sided copy key for performing a setting of 1-sided/2-sided copy, a finish key for performing a setting of post processing such as punching or stapling, further, a special modes key 44 for performing other detailed settings in copying, a preview confirm key 45 for confirming a finish state of an image read by a scanner, an image input from an external device, or an image stored in a storage apparatus such as an HDD, a finish key for setting finish processing (post processing) such as punching processing or stapling processing, and the like, are provided. A user is possible to display a preview of image data after the original reading at this point by using the touch panel 32 and operating the preview confirm key 45. Note that the key 42 or the key 43 is selected to shift to an image send mode or a document filing mode, and at this time, a GUI image for setting in each mode is displayed so that various settings in accordance with each mode are possible.

Figure 5:
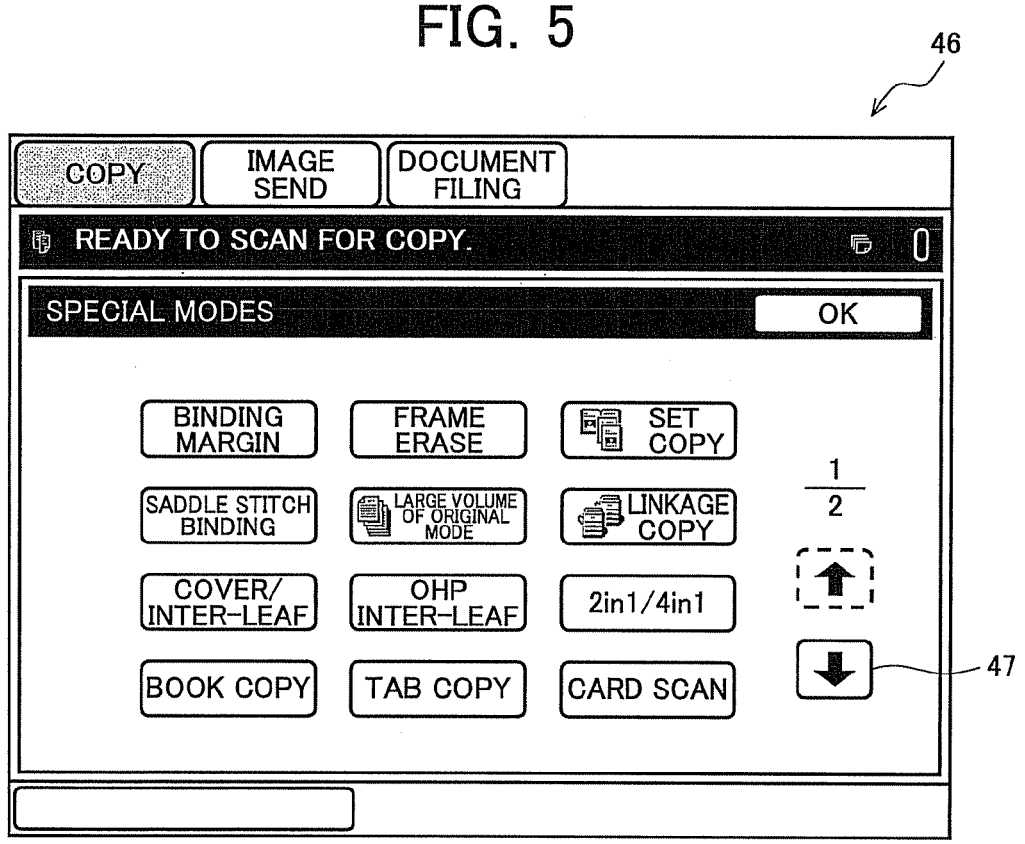
FIG. 5 is a diagram for showing an example of a GUI image displayed when selecting a special function key to perform a detailed setting in copying in the GUI image of FIG. 4.
Figure 6:
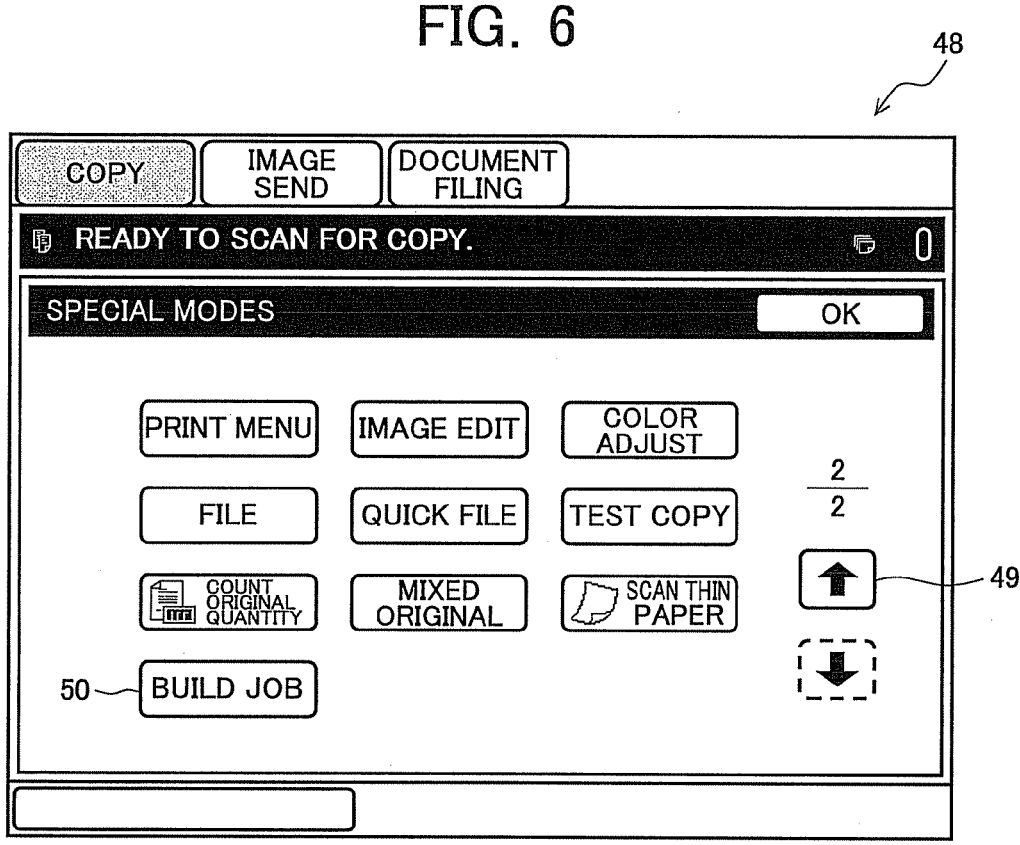
FIG. 6 is a diagram for showing an example of a GUI image displayed when selecting an arrow key in the GUI image of FIG. 5.

FIG. 5 is a diagram for showing an example of a GUI image displayed when the special modes key for performing a detailed setting in copying is selected in the GUI image of FIG. 4, and FIG. 6 is a diagram for showing an example of a GUI image displayed when an arrow key is selected in the GUI image of FIG. 5. Note that, although description will not be given individually, in the diagrams described below including FIGS. 5 and 6, an OK key is displayed, and after depressing the OK key, returning to a previous screen is possible by storing the setting thereof, for example.

In a GUI image 46 shown in FIG. 5, various setting items such as a binding margin, a saddle-stitch binding and the like are displayed so as to be selectable, and since there are many setting items, an arrow key 47 is displayed. By selecting the arrow key 47, like in a GUI image 48 of FIG. 6, other setting items are displayed so as to be selectable. In the GUI image 48, a build job key 50 or the like is displayed as other setting items so as to be selectable and an arrow key 49 for returning to the GUI image 46 is also displayed. By depressing the build job key 50, shifting to a build job mode (original bundle-based processing mode) is possible. Of course, shifting to an original bundle-based processing mode may be executable by an operation on other screens such as an initial screen.

Figure 7:
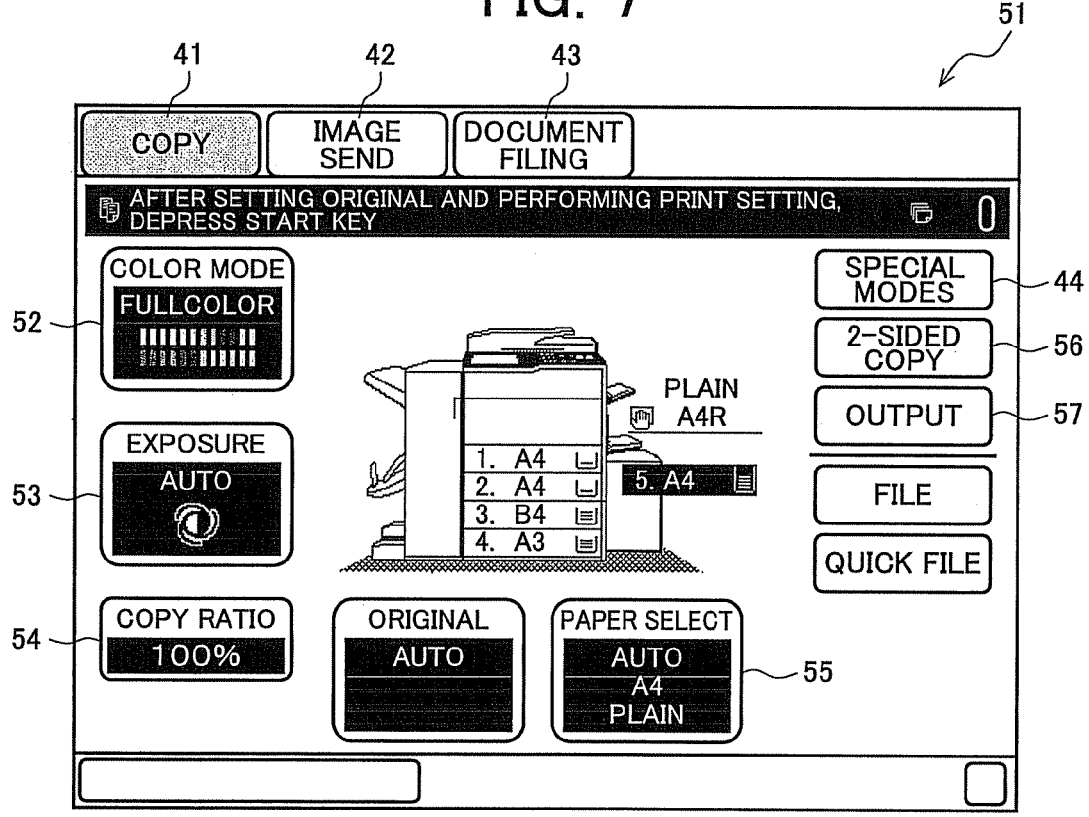
FIG. 7 is a diagram for showing an example of a GUI image displayed when selecting a build job key in the GUI image of FIG. 6.
Figure 8:
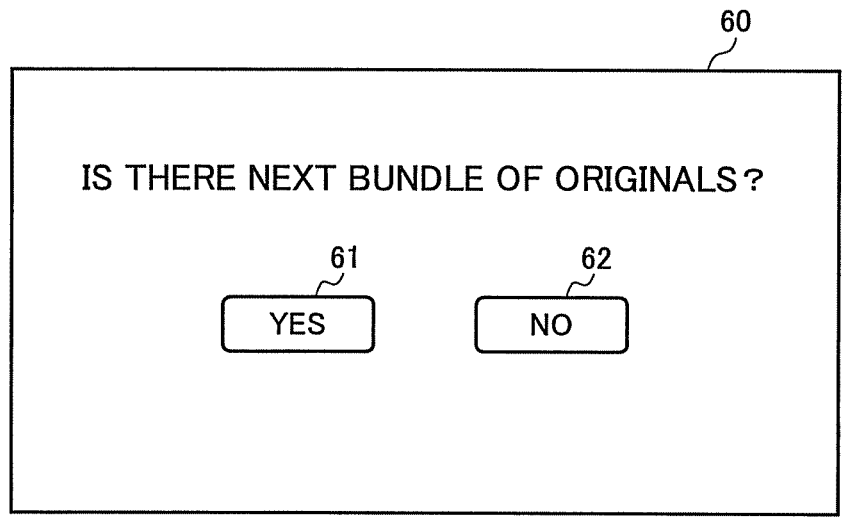
FIG. 8 is a diagram for showing an example of a GUI image displayed when depressing a start key while the GUI image of FIG. 7 is being displayed.

FIG. 7 is a diagram for showing an example of a GUI image displayed when the build job key is selected in the GUI image of FIG. 6, and FIG. 8 is a diagram for showing an example of a GUI image displayed when a start key is depressed in displaying the GUI image of FIG. 7.

The GUI image 51 shown in FIG. 7 is displayed by selecting the build job key 50 of FIG. 6, and thus shifted to an original bundle-based processing mode, and a notation to prompt an operation said "AFTER SETTING ORIGINAL AND PERFORMING PRINT SETTING, DEPRESS START KEY" is made. At this time, in the GUI image 51, a display showing it is in the build job mode may be performed.

In the GUI image 51 shown in FIG. 7, similarly to the GUI image 40 of FIG. 4, a color mode setting key 52 for setting color/monochrome, an exposure setting key 53 for setting an exposure, a copy ratio setting key 54 for setting printing copy ratio, and a paper select setting key 55 for setting printing paper are displayed so as to be selectable. Additionally, in the GUI image 51, further, a reading method setting key for setting whether an original is read on a document platen or an auto document feeder (ADF), a 2-sided setting key 56 for setting either 2-sided copy/1-sided copy is to be executed, a finish setting key 57 for setting a type and position of a stamp, or setting post processing such as punching, stapling, or the like are displayed so as to be selectable. Note that, for the reading method setting key, in the case of the build job mode, auto (that is, an ADF) is often selected, and hereinafter, although description will be given assuming reading by an ADF, there may be a bundle of originals read on a document platen sheet by sheet.

A user firstly set a first bundle of originals on an ADF, and performs a print setting (setting of print conditions) for the bundle of originals using each of these keys, and after setting, depresses a start key. Thus, reading of the bundle of originals is started. Then, for the read image data, reducing/enlarging, layout, or color conversion (for example, a conversion from color to monochrome) is applied based on the set print conditions, and stored in the image storage portion 15 associating as image data for a subjob thereof.

Furthermore, the preview image generating portion 16*a* generates a thumbnail image of a top page for the image data, and stores in the image storage portion 15 temporarily associating with a subjob thereof, similarly. Since there is a possibility of using in later confirmation, it is preferable to generate a thumbnail image not only for the top page but also for the other pages. Note that, since the build job mode herein described often requires confirmation, although description has been given assuming that a preview display is performed, whether or not a preview display is performed may be selectable by a user.

At the time when the reading of first bundle of originals has been completed, like in a GUI image 60 of FIG. 8, an image that asks whether or not there is a next bundle of originals, is displayed. In the GUI image 60, a YES key 61 and a NO key 62 are included in a state so as to be selectable, and when the NO key 62 is selected, with the bundle of originals processed up to that time (in the example here, only the first bundle of originals), a preview display described next will be performed.

On the other hand, when the YES key 61 is selected, the GUI image 51 of FIG. 7 is displayed again, and for the next bundle of originals, the bundle of originals is set on an ADF, a print setting is made, and a start key is depressed. Thus, for this bundle of originals, a thumbnail image of a top page (and other page) is generated, and stored. Note that, even when generation of a preview image (a thumbnail image of a top page, and preferably thumbnail images of other pages at this point) for the previous bundle of originals has not been finished, usually, the processing is able to be completed in reading the bundle of originals.

In this manner, at the time when reading of all the bundles of originals desired by a user has been completed, and the NO key 62 is selected (when a thumbnail image for all top pages thereof is not completed, waiting therefor), the preview image generating portion 16a reads a thumbnail image of a top page of image data corresponding to each bundle of originals (that is, each subjob) from the image storage portion 15, and that are arranged to generate a preview image that is displayed by the panel control portion 11 on the touch panel 32.

Figure 9:
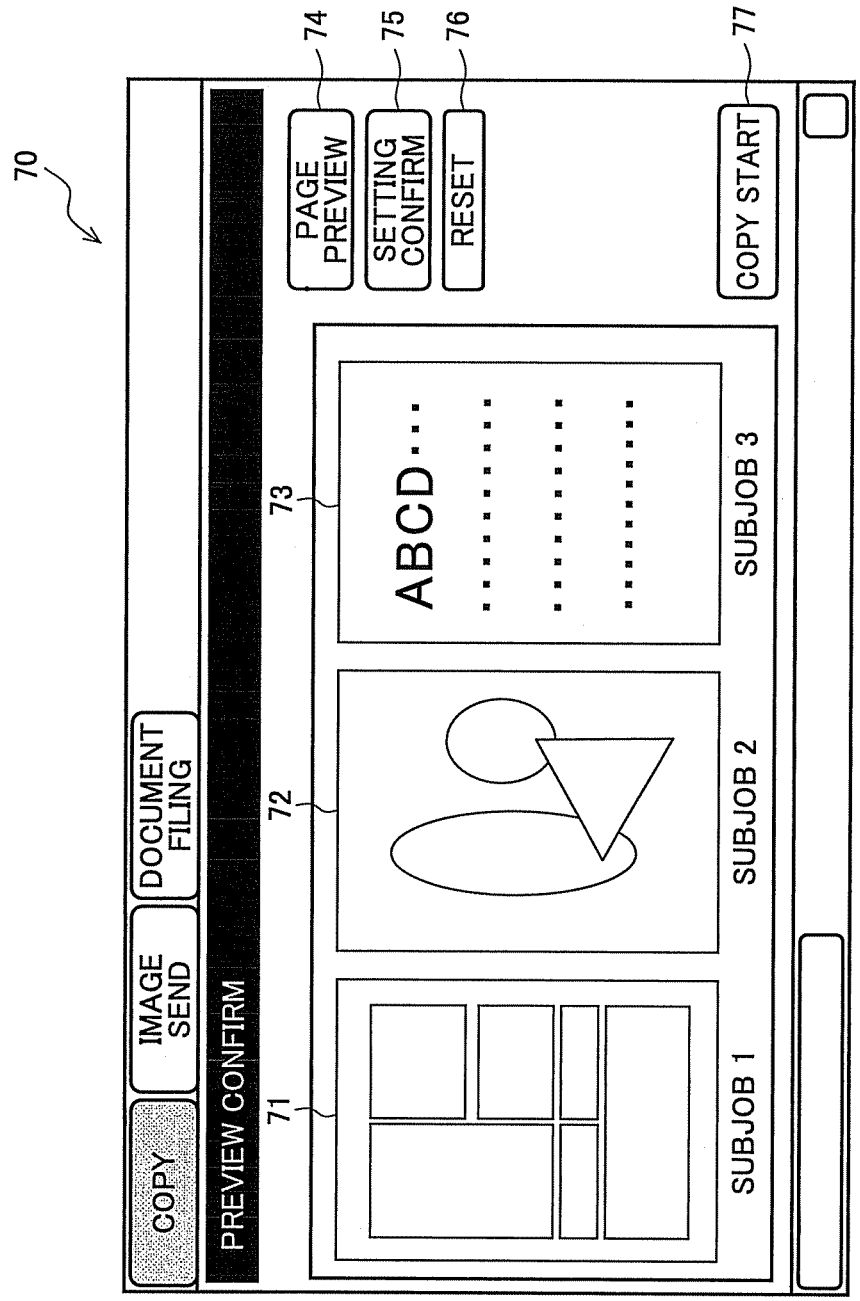
FIG. 9 is a diagram for showing an example of a GUI image displayed when selecting NO key in the GUI image of FIG. 8, and is a diagram showing an example of a screen displaying a preview in an original bundle-based processing mode in the digital multifunctional peripheral of FIGS. 2 and 3.

By such processing, a screen illustrated as a GUI image 70 of FIG. 9 is displayed. FIG. 9 is a diagram for showing an example of a GUI image displayed when the NO key is selected in the GUI image of FIG. 8, and a diagram for showing an example of a screen displayed for previewing in original bundle-based processing mode in the digital multifunctional peripheral of FIGS. 2 and 3.

The GUI image 70 shown in FIG. 9 is displayed when the NO key 62 is selected in the GUI image 60 of FIG. 8. In the GUI image 70, each of thumbnail images 71 to 73 generated as described above by the preview image generating portion 16a from the image data to be printed of each subjob, is displayed for previewing on the touch panel 32 by the panel control portion 11. Note that, although an example including three bundles of originals (that is, three subjobs) is described herein, the number is not limited thereto.

For example, when print conditions of the subjobs 1 and 3 are color printing, and print conditions of the subjob 2 are monochromatic printing, the thumbnail image 71 of the top page of the subjob 1, and the thumbnail image 73 of the top page of the subjob 3 are displayed in color, and the thumbnail image 72 of the top page of the subjob 2 is displayed in monochrome. Furthermore, in a case where additional information such as a stamp or a page number, or contents of post processing are different in each subjob, thumbnail images in accordance therewith are able to be displayed. Note that, generally, the post processing such as punching or stapling is often a common setting in all the subjobs (that is, all the bundles of originals).

In this way, in the present invention, in the original bundle-based processing mode, when a read original is displayed for previewing, the setting in each of the subjobs 1 to 3 is able to be confirmed easily in a short time by arranging and displaying the thumbnail images 71 to 73 of the top page of each of subjobs 1 to 3.

Note that, as described above, whether or not all the generated thumbnail images of the top pages are displayed is optionally decided since there is also the concern about the display area. For example, when displaying as a size of a thumbnail image like in FIG. 9 and when there are four or more subjobs (four or more bundles of originals), in the GUI image 70, a key to display a top page of next subjob group may be displayed so as to be selectable. However, it is preferable that a thumbnail image of a top page of each subjob is generated so as to be fit into a determined display area according to the number of subjobs (that is the number of original bundles) and thereby the thumbnail images of all the subjobs are all arranged and displayed in the display area above.

Furthermore, in the GUI image 70, a copy start key 77 for actually starting copy processing (starting print processing) is also displayed so as to be selectable. When a user judges there is no problem after confirming each of thumbnail images 71 to 73, by selecting the copy start key 77, printing of all the subjobs is able to be executed actually.

Figure 10:
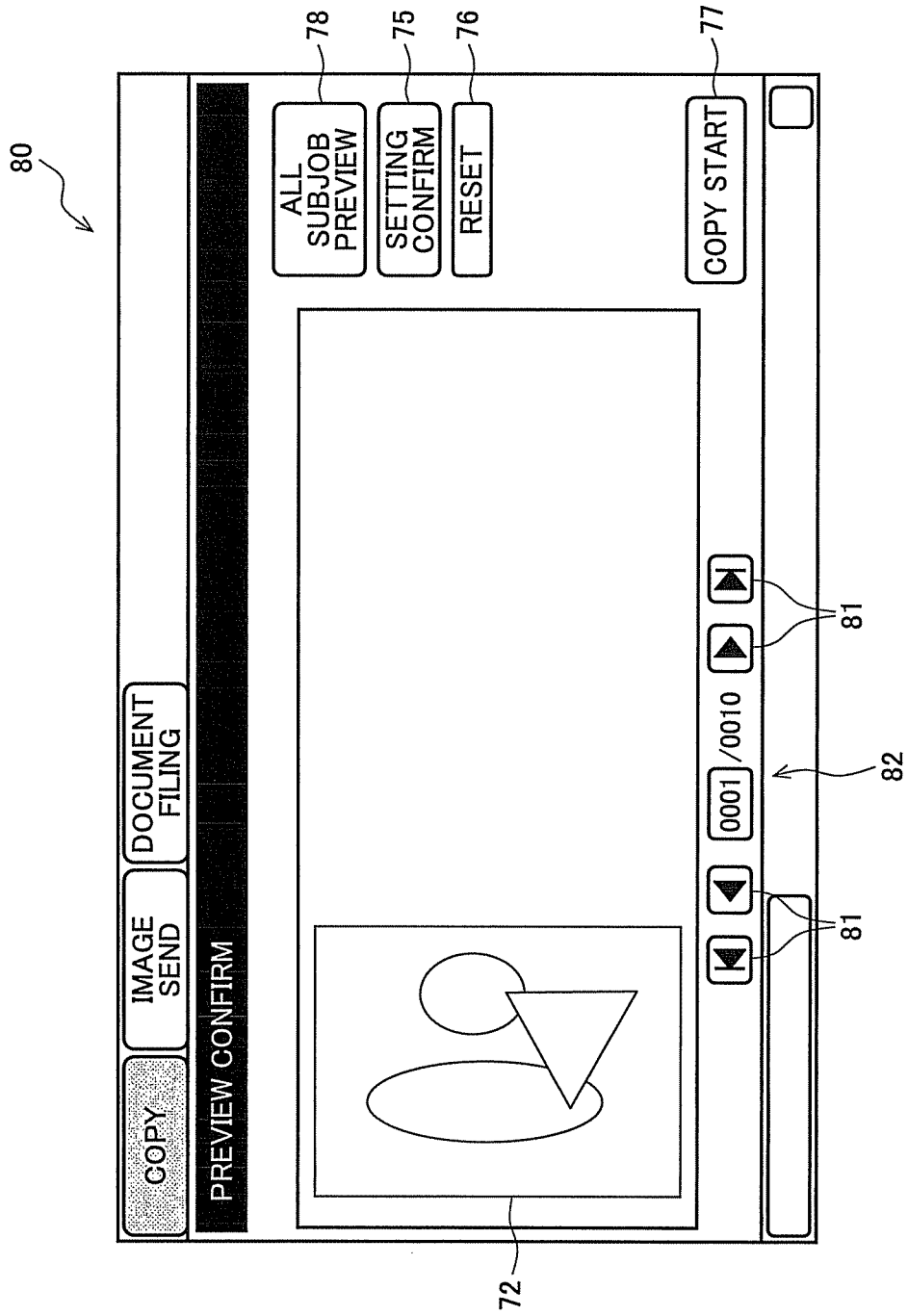
FIG. 10 is a diagram for showing an example of a GUI image displayed when selecting subjob 2 and selecting a page preview key in the GUI image of FIG. 9.

Additionally, as well as such a list display of thumbnail images 71 to 73, it is preferable to configure that displaying a preview per page basis for image data of each subjob is executable. Description will be given for such an exemplary configuration with reference to FIG. 10 as well. FIG. 10 is a diagram for showing an example of a GUI image displayed when the subjob 2 is selected and a page preview key 74 is selected in the GUI image of FIG. 9.

In the GUI image 70, the page preview key 74 for confirming pages other than the top page of each subjob by a preview is included. First, a thumbnail image (thumbnail image 72, for example) of a subjob that the user desires to confirm is selected, and the page preview key 74 is selected to display the GUI image 80 illustrated in FIG. 10.

In the GUI image 80, as well as only the selected thumbnail image (thumbnail image 72 in this example) is displayed for previewing, page switch keys 81 is displayed for changing a displayed page of the thumbnail image 72, together with information 82 showing a current page. In addition, since the thumbnail image 72 of the top page has already been confirmed by the user in the GUI image 70, the thumbnail image of, not the top page, but the next page or the final page may be displayed firstly in the GUI image 80.

In the page switch keys 81, a top page shift key for displaying a first page of the subjob, a previous page shift key for displaying a page before a current page of the subjob, a next page shift key for displaying a page next to a current page of the subjob, and a last page (final page) shift key for displaying the last page of the subjob are included. The thumbnail image 72 is displayed for each page in this manner, and by operating the page switch keys 81 as appropriate, a user is able to display a preview image (thumbnail image) of an arbitrary page of the image data of the subjob.

Furthermore, in the GUI image 80, an all subjob preview key (all thumbnail display key) 78 for returning to the GUI image 70 of FIG. 9 is preferably displayed so as to be selectable. By selecting the key 78, a user is able to confirm the thumbnail display of FIG. 9 again.

Additionally, by selecting one of the thumbnail images 71 to 73 (or selecting 2 consecutive times) without displaying the page preview key 74, processing to shift to the preview display screen per page basis like in the GUI image 80 of FIG. 10 may be employed.

As illustrated herein, the display control portion displays each thumbnail image of the top page corresponding to each subjob so as to be selectable by the operation portion, and when one of a thumbnail image being displayed is selected by the operation portion (or when the selection is made and the page preview key 74 is selected), image data of the top page (or next page, or final page) of the bundle of originals corresponding to the selected thumbnail image is preferable to be displayed on the display portion. Although the image data of the top page (or next page) may be an actual image data itself, as has been described for the generation of a thumbnail image of a page other than a top page, a reduced thumbnail image thereof is preferable.

In this manner, when displaying a preview in the original bundle-based processing mode, firstly a top page of each bundle of originals is arranged to perform a thumbnail display, and thereby a rough confirmation thereof by a user is possible, and, further, when the user desires to know the details thereof, by only touching the thumbnail image (or touching to only select the page preview key 74), displaying a preview of the page is able to be performed.

Additionally, in the GUI image 80, a copy start key 77 for actually starting copy processing (starting print processing) may be displayed so as to be selectable. When a user judges there is no problem after confirming a thumbnail image and pages other than the top page, by selecting the copy start key 77, printing of all the subjobs is executed actually.

Figure 11:
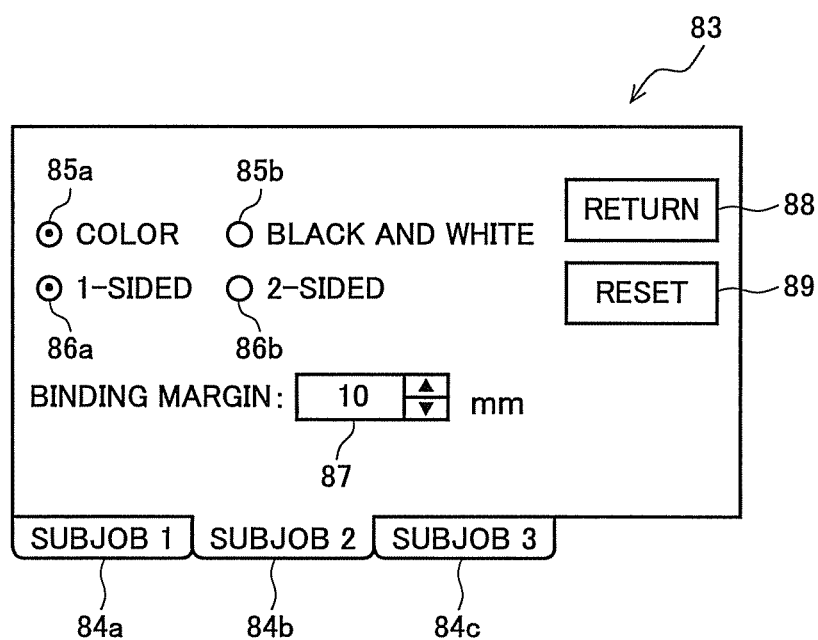
FIG. 11 is a diagram for showing an example of a GUI image displayed when selecting subjob 2 and selecting a setting confirm key in the GUI image of FIG. 9.

Next, description will be given for the configuration in which the actual setting contents are able to be confirmed, with reference to FIG. 11. FIG. 11 is a diagram for showing an example of a GUI image displayed when the subjob 2 is selected and a setting confirm key is selected in the GUI image of FIG. 9.

The user sometimes desires to confirm the actual setting contents, in addition to the confirmation at the thumbnail images 71 to 73 or the confirmation of the thumbnail image per page basis. Accordingly, in the GUI image 70 of FIG. 9 and the GUI image 80 of FIG. 10, a setting confirm key 75 is preferably displayed so as to be selectable.

In the GUI image 70, any of the thumbnail images of the subjobs is selected, and when the setting confirm key 75 is selected, a GUI image 83 illustrated in FIG. 11 is able to be displayed. In the GUI image 83, each of setting contents such as color/black and white (monochrome), 1-sided/2-sided or a binding margin is displayed.

Additionally, since the GUI image 83 is displayed by selecting the setting confirm key 75 after selecting the thumbnail image 72, the setting contents herein displayed is for the subjob 2. However, there may be a case where a confirmation or change is desired for setting contents of other subjobs 1 and 3, tabs 84*a*, 84*b*, and 84*c* for displaying the setting contents of each subjob are displayed so as to be selectable. In addition, in the GUI image 83, a key 88 to return to the previous screen is displayed so as to be selectable.

As illustrated herein, the display control portion preferably displays the setting confirm key for confirming the print conditions of each bundle of originals together with a thumbnail image of a top page of each subjob (each bundle of originals) on the display portion so as to be selectable by the operation portion. In addition, although an example that the setting confirm key 75 is selected after selecting any of the thumbnail images 71 to 73, has been illustrated, when the setting confirm key 75 is selected without selecting any thumbnail image, setting contents for all the subjobs may be displayed, for example.

Furthermore, in the GUI image 83, so as to be able to change the setting further in this screen, a color selection radio button 85*a*, a black and white selection radio button 85*b*, a 1-sided selection radio button 86*a*, a 2-sided selection radio button 86*b*, a binding margin input area 87 are displayed. Thereby, in the original bundle-based processing mode, when displaying a preview of the read original, setting at each subjob is possible to be changed easily. Furthermore, in the GUI image 83, a reset key 89 for returning to the previous screen by holding the setting changed by the button 85*a* or the like.

Additionally, in the GUI image 83, although an example in which the setting is changeable in the setting contents confirm screen has been cited, even in an example in which a setting contents confirm screen where a setting is not changeable is displayed, a user sometimes desires to change actual setting contents in confirmation by the thumbnail images 71 to 73 or confirmation of the thumbnail image per page basis.

Accordingly, in the GUI image 70 of FIG. 9 or in the GUI image 80 of FIG. 10, a reset key 76 is preferably displayed so as to be selectable. In a state where any of thumbnail images 71 to 73 in the GUI image 70 is selected, or in a state where the GUI image 80 is displayed, a user is able to, by operating the reset key 76, display a GUI image to reset print conditions (including a setting of post processing or adding processing of additional information) of the thumbnail image in being selected or being displayed. Then, for only the subjob corresponding to the thumbnail image using the resetting screen, print conditions is reset so that the thumbnail images 71 to 73 based on the reset print conditions are able to be displayed.

As illustrated herein, the display control portion preferably displays, together with the thumbnail image of the top page per subjob (per bundle of originals), a change key (reset key 76) for changing print conditions per bundle of originals on the display portion so as to be selectable by the operation portion. Thus, in the original bundle-based processing mode, when displaying a preview of the read original, the setting at each subjob is possible to be changed easily. Additionally, although an example of selecting the reset key 76 after selecting any of the thumbnail images 71 to 73 (and after shifted to the selected GUI image 80) is shown, when the reset key 76 is selected without selecting any of the thumbnail images, a screen on which the setting contents of all the subjobs is changeable may be displayed.

Figure 12:
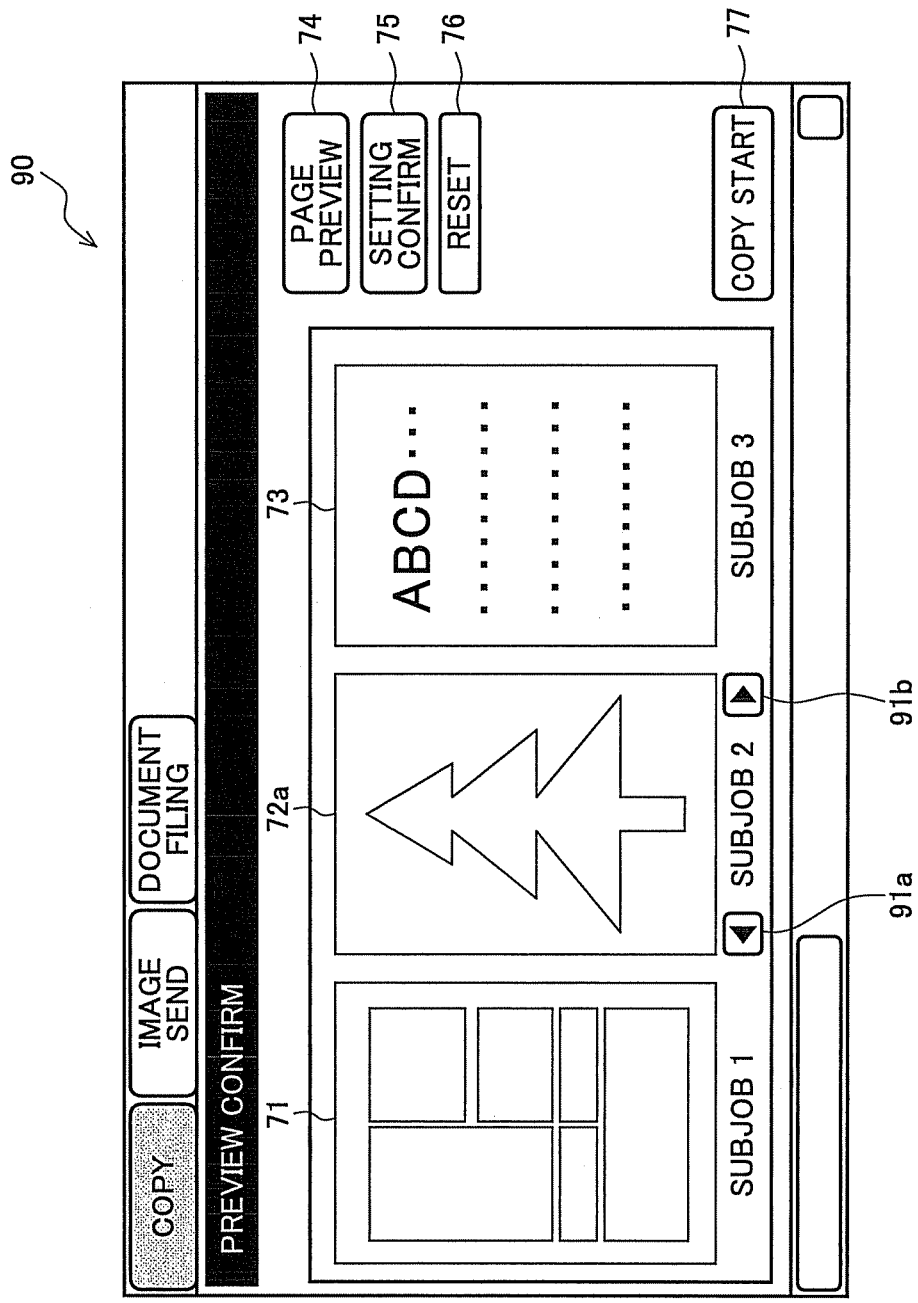
FIG. 12 is a diagram for showing another example of a GUI image displayed when selecting subjob 2 and selecting a page preview key in the GUI image of FIG. 9.

Next, description will be given for an example that is different from FIG. 10 of the page preview with reference to FIG. 12. FIG. 12 is a diagram for showing another example of a GUI image displayed when the subjob 2 is selected and the page preview key is selected in the GUI image of FIG. 9.

A GUI image 90 illustrated in FIG. 12 is displayed when the subjob 2 is selected and the page preview key 74 is selected in the GUI image 70 of FIG. 9. In the GUI image 90, page shift keys 91*a* and 91*b* for displaying a page other than a top page for the selected subjob are displayed so as to be selectable. The user is, by selecting the page shift key 91*a* or 91*b*, possible to perform a page shift in the subjob. For example, in FIG. 12, a thumbnail image 72*a* that is the next page of the top page is displayed. Additionally, at the same time, a key for shifting a display to a top of the next or previous bundle of originals may be displayed so as to be selectable, and for example, displays such as the information 82 showing the current page and the page switch keys 81 of FIG. 10 may also be employed.

As described herein, the display control portion preferably displays, together with the image data of the top page of the bundle of originals corresponding to the selected thumbnail image, the page shift key for displaying other page of the bundle of originals on the display portion so as to be selectable by the operation portion. In addition, at the time of initially displaying the thumbnail images 71 to 73 of the top pages, the page shift key such as the page shift keys 91*a* and 91*b* may be displayed so as to be selectable in the vicinity of each of the thumbnail images 71 to 73.

Note that, when the page preview key 74 is not to be displayed in the GUI image 70 of FIG. 9, as described above, one of the thumbnail images 71 to 73 is selected (or selecting 2 consecutive times), the GUI image 90 of FIG. 12 may be displayed.

The page preview key 74 in the GUI image 90 of FIG. 12 is a key for displaying the thumbnail images 71 and 73 per page basis, for which preview per page basis is not possible currently. That is, when any of the thumbnail images 71 and 73 is selected and the page preview key 74 is selected, the page shift key is displayed so that a page preview is possible for the thumbnail images 71 and 73, thereby the display of the subsequent pages is possible. Note that, in the GUI image 90, the setting confirm key 75, the reset key 76, or the copy start key 77 may be displayed so as to be selectable.

Figure 13:
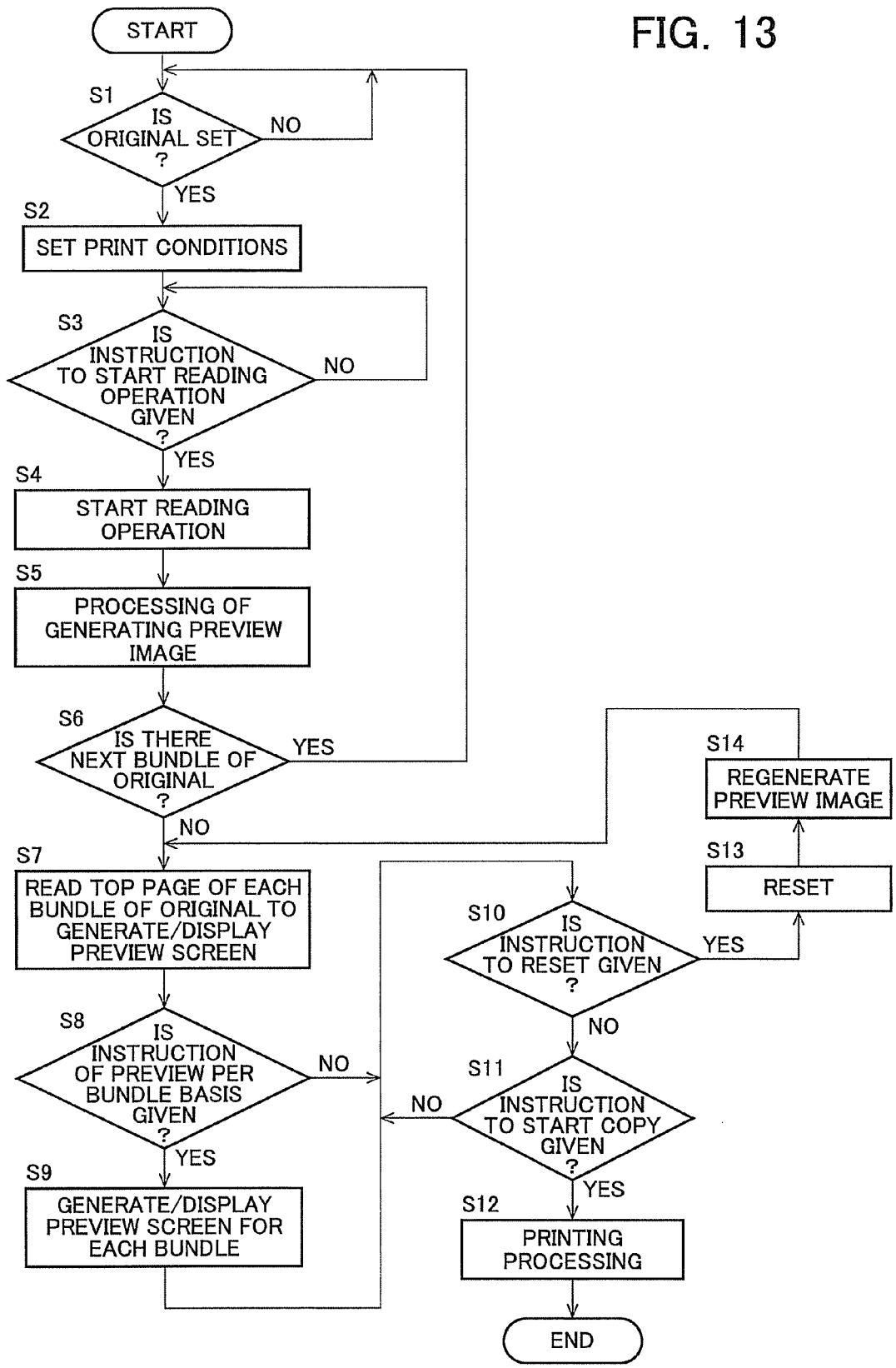
FIG. 13 is a flowchart for explaining an example of processing when displaying a preview in an original bundle-based processing mode in the digital multi-functional peripheral of FIGS. 2 and 3.

Next, description will be given for the flow when an original image that is the object of printing (image formation) is read to be displayed for previewing, with reference to FIG. 13. FIG. 13 is a flowchart for explaining an example of processing when performing a preview display in the original bundle-based processing mode. Here, description will be given assuming it is in the original bundle-based processing mode and a preview display is performed.

First, the main control portion 18 confirms whether an original is set on a document platen or an ADF in the reading portion 13 (step S1), and when the original is set (in the case of YES at step S1), a user operation for setting print conditions is received to reflect the setting (step S2).

Then, the main control portion 18 waits for an instruction to start a reading operation (for example, a depressing operation of a start key) (step S3), and when the instruction is received, the reading portion 13 is instructed to perform original reading (step S4). Whereby, the reading portion 13 starts the original reading. Subsequently, the main control portion 18 instructs the preview image generating portion 16a to execute processing of generating a thumbnail image based on the read image data (step S5).

Then, the main control portion 18 displays a GUI image 60 of FIG. 8 and waits for a user operation, and determines whether or not there is a next bundle of originals based on the user operation (step S6). When there is the next bundle of originals, steps S1 to S5 are repeated for the next bundle of originals. At the time when it is determined that there is no next bundle of originals (in the case of NO at step S6), the main control portion 18 instructs the panel control portion 11 and the preview image generating portion 16a to arrange the thumbnail image of the top page of each bundle of originals to generate a preview screen, that is displayed on the touch panel 32 (step S7). By this processing, the GUI image 70 of FIG. 9, for example, is displayed.

In a state where the GUI image 70 is being displayed, the main control portion 18 determines whether or not any of the thumbnail images 71 to 73 is selected and the page preview key (key for displaying each page of a bundle of the selected thumbnail image) 74 is selected (step S8). Here, when the page preview key 74 is selected, the main control portion 18 instructs the panel control portion 11 and the preview image generating portion 16a to generate and display a preview screen of the bundle (step S9). By this processing, the GUI image 80 of FIG. 10, for example, is displayed.

On the other hand, in the case of NO at step S8 or after processing at step S9, the main control portion 18 determines whether or not there is a selection of the reset key 76 that accompanies the selection of the thumbnail image (step S10), and when there is not, whether or not there is a selection of the copy start key 77 is determined (step S11), and when there is the selection of the copy start key 77, print processing is executed (step S12).

In the case of NO at step S11, returning to step S10 or returning to step S8 is possible. In the case of YES at step S10, the main control portion 18 controls the panel control portion 11 to display the reset screen, and waits for the resetting operation by the user, and based on the operation, resetting (resetting for the subjob of the selected thumbnail image) is executed (step S13). Next, the main control portion 18 instructs the preview image generating portion 16a to regenerate the thumbnail image of the reset subjob (step S14), and returns to step S7.

Hereinbefore, description has been given for the thumbnail display in the original bundle-based processing mode according to the present invention, and in the above description, it is assumed that any bundle of originals does not exceed the number of sheets that is able to be read by an ADF. However, there is a case of exceeding that in reality. For example, when the readable number of sheet by an ADF is 100 sheets, the upper limit of one bundle of originals is 100 sheets, and there is a case where the same print conditions is desired to be applied to an bundle of originals consisting of 101 sheets or more.

In such a case, when printing is desired to be made under the same print conditions for 200 sheets, for example, original reading processing may be performed under the same print conditions to two bundles of originals. In this case, a thumbnail image of a top page of the two bundles of originals is displayed by a list. On the other hand, when such display is desired to be avoided, it may be configured that after the original reading, a display such as "IS THERE STILL ANY ORIGINAL DESIRED TO BE PRINTED CONTINUOUSLY UNDER THE SAME PRINT CONDITIONS" is made, and when "YES" is input, the first 100 sheets and the next 100 sheets are handled as one subjob. In this case, by this one subjob, mass original processing exceeding the limit number of sheets of reading by an ADF is able to be performed.

Hereinbefore, although description has been given for the preview display (thumbnail display) in the original bundle-based processing mode of the present invention, by illustrating the digital multi-functional peripheral 1, this invention may be embodied as a preview display method in such an image forming apparatus. That is, the preview display method includes, a step of receiving a selection of an original bundle-based processing mode by an operation portion, a step of receiving an operation of displaying a preview image by the operation portion, and a step of generating, when displaying a preview image in an original bundle-based processing mode, a thumbnail image by reducing image data of a top page from each of the image data read at each subjob and arranging the generated thumbnail images corresponding to each subjob as a preview image to display on the display portion. Another example of application is same as has been described.

<Description of Preview Display Before Printing Image Data According to Another Embodiment of the Present Invention>

Description will hereinafter be given for another embodiment of the present invention. As has been described hereinbefore a preview display operation before printing in copying, the digital multi-functional peripheral 1 according to the present invention has a preview image generating portion 16a that reads image data read by a scanner apparatus illustrated by the reading portion 13 to be printed from the image storage portion 15 and generates a preview image thereof. The preview image generated by the preview image generating portion 16a is sent to the touch panel 32 by the control of the main control portion 18, is controlled by the panel control portion 11 to be displayed in a state of being incorporated in a GUI image, and is displayed on the touch panel 32. In this manner, the touch panel 32 is an example of the display portion for displaying a preview of the image data to be printed. In addition, the panel control portion 11 is an example of a display control portion that displays the preview image generated by the preview image generating portion 16a, for example, in a state of being incorporated in the screen that has already been provided in advance, on the display portion.

Then, in the digital multi-functional peripheral 1 according to the present invention, an original bundle-based processing mode is possible to be selected by an operation portion. The operation portion is able to be illustrated as the touch panel 32, or the touch panel 32 and the key operation portion 31.

The original bundle-based processing mode, here, is a mode for executing a plurality of subjobs, to each of which print conditions is set, as one print job. The plurality of these subjobs are subjobs that correspond to each of a plurality of bundles of originals that are the objects of original reading. Then, before executing printing, image data corresponding to these subjobs is collected as one file and stored in the image storage portion 15 temporarily, and read by the recording portion 12 in executing printing. That is, one file is generated by one print job. In this manner, in the original bundle-based processing mode, original reading processing is performed for each bundle of originals for obtaining subjob data of each bundle of originals, and one file is generated based on print conditions set for each bundle of originals, and print processing is executed.

The main characteristic of the present invention is that the above-described display control portion, in the case of displaying a preview image in an original bundle-based processing mode (that is, when a setting is such that an original bundle-based processing mode is selected and a preview image is displayed), displays a change key for changing only print conditions of a bundle of originals being displayed as a preview image (a subjob being displayed) on the display portion by an operation portion so as to be selectable.

The present invention, by such a configuration, enables to easily change a setting at each subjob when a read original is displayed for previewing in an original bundle-based processing mode, in which a plurality of subjobs are handled as one job.

Furthermore, as described above, adding additional information to image data to be printed and outputting it, or printing image data to be printed on recording paper and applying post processing to the recording paper may be possible. In such a case, in the digital multi-functional peripheral 1, the panel control portion 11 performs a control to display an additional information image showing additional information or post processing on the touch panel 32 based on the control of the main control portion 18. Thus, the preview image generating portion 16a generates such an additional information image and synthesizes with a preview image generated by the image data to be printed, to generate a preview image with an additional information image added thereto. A synthesizing position is a position of the preview image corresponding to an adding position of additional information or a position at which the post processing is applied. In this manner, when outputting image data to be printed with additional information (a stamp, date, page number, and the like) added thereto and when outputting recording medium at which post processing such as punching or stapling is applied, a final state of image formation is possible to be confirmed.

Note that, although description has been given for the preview display before printing, as description has been given for the preview display operation in facsimile sending or in transmitting image data through the internet, not only for the image data to be printed, but also for the image data to be transmitted (that is, the image data that is the object of the output other than printing), similar processing is possible to be performed. In this case, the original bundle-based processing mode is a mode to execute a plurality of subjobs that correspond to each of plurality of bundles of originals that are the objects of original reading, and to each of which transmitting conditions is set, as one transmitting job.

Additionally, although description has been given assuming an original reading, image data to be printed or transmitted is not limited to image data input from a scanner apparatus illustrated as the reading portion 13, but may be image data input from an attachable/detachable storage apparatus illustrated as the USB memory connected to the USB I/F 25, image data input from a communication line illustrated as the LAN or the line, or image data read from a storage apparatus illustrated as the image storage portion 15. In this case, an original bundle-based processing mode is a mode to execute a plurality of subjobs that correspond to each of plurality of bundles to be output, and to each of which an output condition is set, as one output job.

<Specific Example 2 of Preview Display>

Referring to FIGS. 4 to 8 and 14 to 20B, description will hereinafter be given for the flow of a preview display in an original bundle-based processing mode, with specific examples thereof. Although printing in copying is illustrated mainly in the example below, it is also applicable such as in printing in facsimile receiving, in printing of image data read by a USB memory or the like, in facsimile sending, or in internet FAX sending and receiving.

FIG. 4 is a diagram for showing an example of a standard screen of the digital multi-functional peripheral explained in FIGS. 2 and 3. FIG. 4 shows an example of a GUI image (referred to as a GUI image 40) displayed on the touch panel 32 in the digital multi-functional peripheral 1 as the standard screen. The GUI image 40 of the standard screen is displayed on the touch panel 32 when a power source of the digital multi-functional peripheral 1 is turned on or reset. In the GUI image 40, a copy mode selection key 41, an image send mode selection key 42, and a document filing mode selection key 43 are displayed to select an operation mode of the digital multi-functional peripheral 1, and the GUI image 40 shows a state where the copy mode is selected.

In the copy mode, various condition settings are possible to perform a copy. For example, a 2-sided copy key for performing a setting of 1-sided/2-sided copy, a finish key for performing a setting of post processing such as punching or stapling, further, a special modes key 44 for performing other detailed settings in copying, a preview confirm key 45 for confirming a finish state of an image read by a scanner, an image input from an external device, or an image stored in a storage apparatus such as an HDD, a finish key for setting finish processing (post processing) such as punching processing or stapling processing, and the like, are provided. A user is possible to display a preview of image data after the original reading at this point by using the touch panel 32 and operating the preview confirm key 45. Note that the key 42 or the key 43 is selected to shift to an image send mode or a document filing mode, and at this time, a GUI image for setting in each mode is displayed so that various settings in accordance with each mode are possible.

FIG. 5 is a diagram for showing an example of a GUI image displayed when the special modes key for performing a detailed setting in copying is selected in the GUI image of FIG. 4, and FIG. 6 is a diagram for showing an example of a GUI image displayed when an arrow key is selected in the GUI image of FIG. 5. Note that, although description will not be given individually, in the diagrams described below including FIGS. 5 and 6, an OK key is displayed, and after depressing the OK key, returning to a previous screen is possible by storing the setting thereof, for example.

In a GUI image 46 shown in FIG. 5, various setting items such as a binding margin, a saddle-stitch binding and the like are displayed so as to be selectable, and since there are many setting items, an arrow key 47 is displayed. By selecting the arrow key 47, like in a GUI image 48 of FIG. 6, other setting items are displayed so as to be selectable. In the GUI image 48, a build job key 50 or the like is displayed as other setting items so as to be selectable and an arrow key 49 for returning to the GUI image 46 is also displayed. By depressing the build job key 50, shifting to a build job mode (original bundle-based processing mode) is possible. Of course, shifting to an original bundle-based processing mode may be executable by an operation on other screens such as an initial screen.

FIG. 7 is a diagram for showing an example of a GUI image displayed when the build job key is selected in the GUI image of FIG. 6, and FIG. 8 is a diagram for showing an example of a GUI image displayed when a start key is depressed in displaying the GUI image of FIG. 7.

The GUI image 51 shown in FIG. 7 is displayed by selecting the build job key 50 of FIG. 6, and thus shifted to an original bundle-based processing mode, and a notation to prompt an operation said "AFTER SETTING ORIGINAL AND PERFORMING PRINT SETTING, DEPRESS START KEY" is made. At this time, in the GUI image 51, a display showing it is in the build job mode may be performed.

In the GUI image 51 shown in FIG. 7, similarly to the GUI image 40 of FIG. 4, a color mode setting key 52 for setting color/monochrome, an exposure setting key 53 for setting an exposure, a copy ratio setting key 54 for setting printing copy ratio, and a paper select setting key 55 for setting printing paper are displayed so as to be selectable. Additionally, in the GUI image 51, further, a reading method setting key for setting whether an original is read on a document platen or an auto document feeder (ADF), a 2-sided setting key 56 for setting either 2-sided copy/1-sided copy is to be executed, a finish setting key 57 for setting a type and position of a stamp, or setting post processing such as punching, stapling, or the like are displayed so as to be selectable. Note that, for the reading method setting key, in the case of the build job mode, auto (that is, an ADF) is often selected, and hereinafter, although description will be given assuming reading by an ADF, there may be a bundle of originals read on a document platen sheet by sheet.

A user firstly set a first bundle of originals on an ADF, and performs a print setting (setting of print conditions) for the bundle of originals using each of these keys, and after setting, depresses a start key. Thus, reading of the bundle of originals is started. Then, for the read image data, reducing/enlarging, layout, or color conversion (for example, a conversion from color to monochrome) is applied based on the set print conditions, and stored in the image storage portion 15 associating as image data for a subjob thereof.

In addition, the preview image generating portion 16a generates a preview image for the image data (or a so-called thumbnail image that is a reduced original image data), that is temporarily stored in the image storage portion 15 similarly in association with a subjob thereof. This preview image is caused to include an additional information image showing contents of additional information such as a stamp and a page number, and post processing. Note that, a build job mode described here is described assuming that a preview display is performed since confirmation is needed in many cases, whether or not a preview display is performed may be selectable by a user.

At the time when the reading of first bundle of originals has been completed, like in a GUI image 60 of FIG. 8, an image that asks whether or not there is a next bundle of originals, is displayed. In the GUI image 60, a YES key 61 and a NO key 62 are included in a state so as to be selectable, and when the NO key 62 is selected, with the bundle of originals processed up to that time (in the example here, only the first bundle of originals), a preview display described next will be performed.

On the other hand, when a YES key 61 is selected, the GUI image 51 of FIG. 7 is displayed again, and for the next bundle of originals, the bundle of originals is set on an ADF, a print setting is made, and a start key is depressed. Accordingly, a preview image is also generated and stored for this bundle of originals. Note that, even when generating a preview image as to a previous bundle of originals has not finished, usually, processing is able to be completed while a bundle of originals is being read.

In this manner, at the time when reading all the bundles of originals that a user desires is completed and a NO key 62 is selected (when at least a first page of all the preview images is not completed, waiting therefor), the preview image generating portion 16a reads a preview image of a top page of all bundles of originals (that is, all subjobs) from the image storage portion 15, generates a preview screen, that is displayed by the panel control portion 11 on the touch panel 32.

Figure 14:
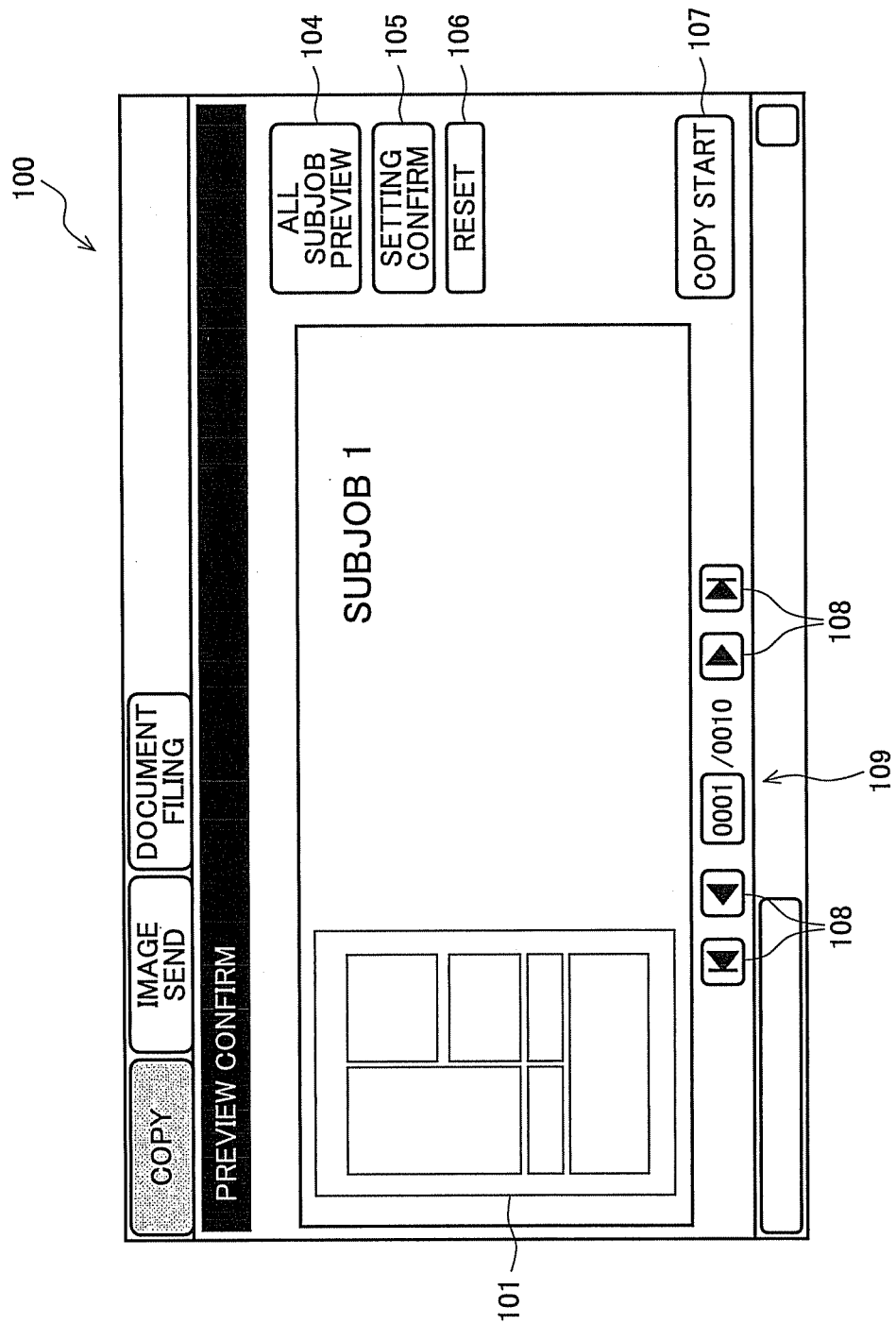
FIG. 14 is a diagram for showing an example of a GUI image displayed when selecting NO key in the GUI image of FIG. 8, and is a diagram showing an example of a screen displaying a preview in the original bundle-based processing mode in the digital multifunctional peripheral of FIGS. 2 and 3.
Figure 15:
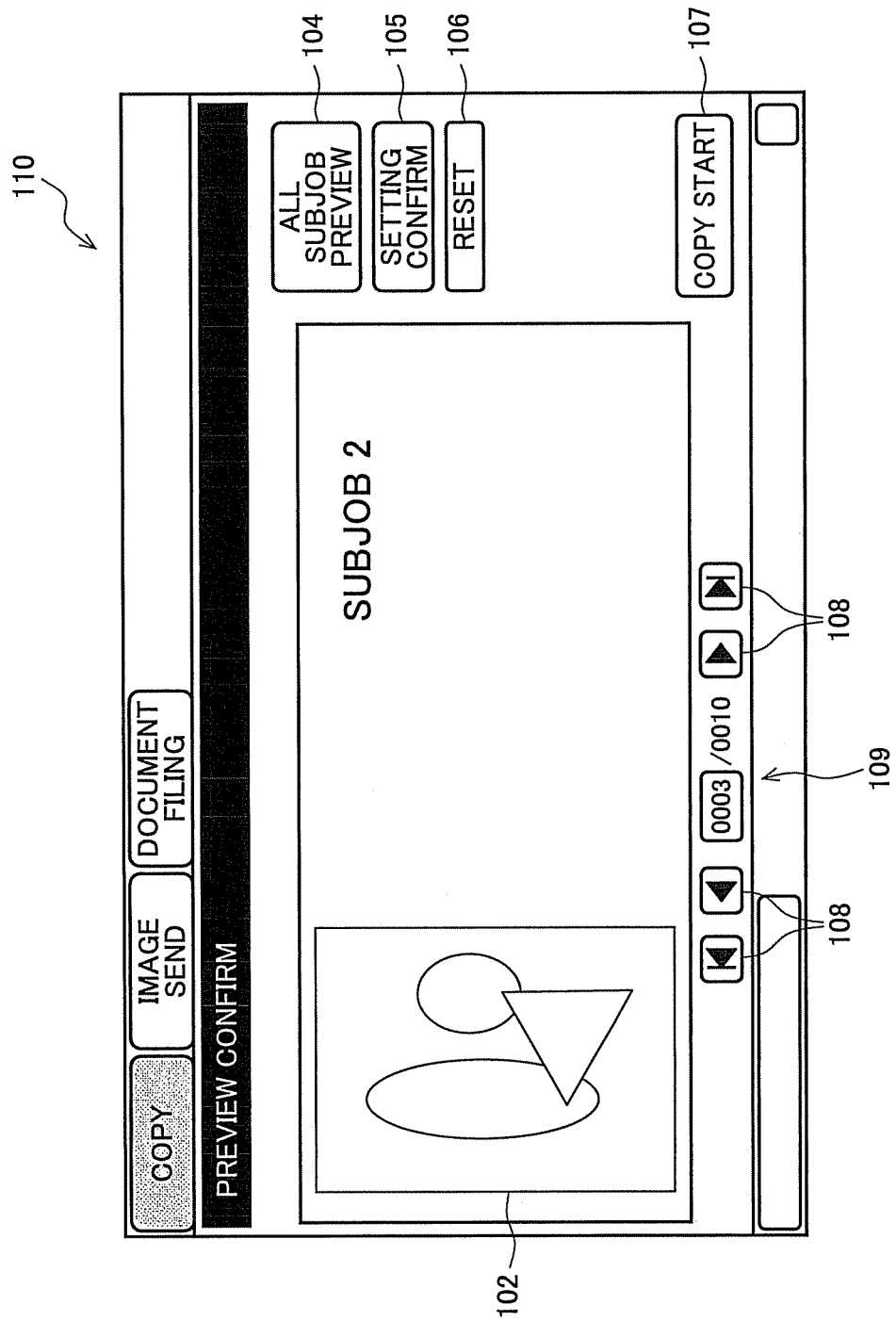
FIG. 15 is a diagram for showing an example of a GUI image displayed when selecting a page switch key in the GUI image of FIG. 14.
Figure 16:
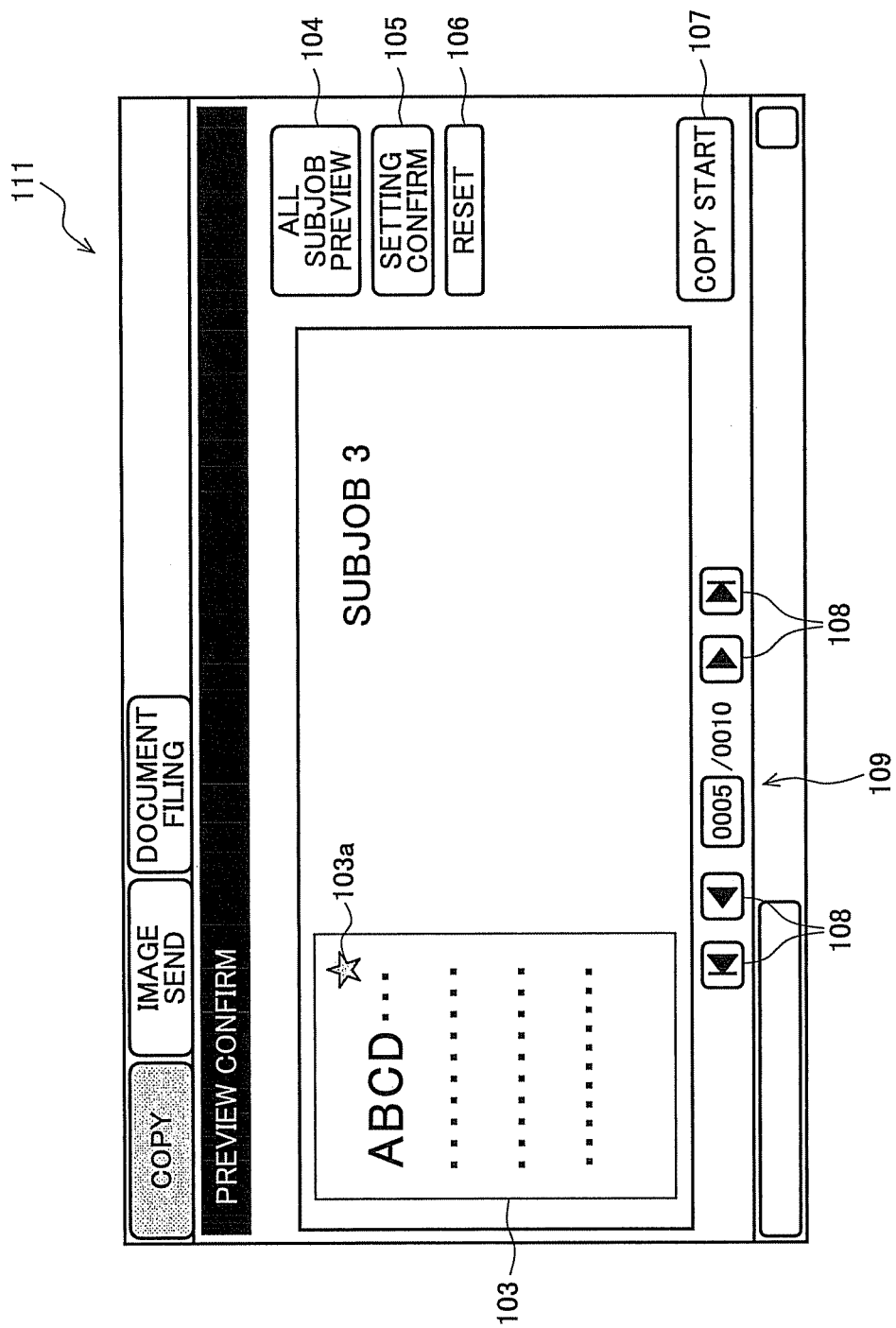
FIG. 16 is a diagram for showing an example of a GUI image displayed when selecting a page switch key in the GUI image of FIG. 15.

By such processing, a screen as illustrated in a GUI image 100 of FIG. 14 is displayed. FIG. 14 is a diagram for showing an example of a GUI image displayed when the NO key 62 is selected in a GUI image of FIG. 8, and is a diagram for showing an example of a screen displayed for previewing in the original bundle-based processing mode in the digital multi-functional peripheral of FIGS. 2 and 3. In addition, FIG. 15 is a diagram for showing an example of a GUI image displayed when a page switch key is selected in a GUI image of FIG. 14, and FIG. 16 is a diagram for showing an example of a GUI image displayed when a page switch key is selected in a GUI image of FIG. 15.

In the GUI image 100 shown in FIG. 14, a preview image 101 of a top page of all bundles of originals (that is, a top page of a first bundle of originals) generated by the preview image generating portion 16a as described above is displayed for previewing by the panel control portion 11 on the touch panel 32.

In this GUI image 100, information ("a subjob 1" in this example) showing what number the subjob is (that is, what number the bundle of originals is) is included near the preview image 101 displayed for previewing. In this way, the display control portion, in the case of displaying a preview image in an original bundle-based processing mode, preferably displays information showing what number bundle (subjob) processed in the print job the current preview image belongs to, on the display portion.

In addition, in this GUI image 100, together with information 109 showing a current page, page switch keys 108 are displayed for changing a page of the preview image 101 being displayed. Here, the information 109 includes information on the total number of sheets collecting all bundles of originals ("10" sheets in total in this example), and information showing the preview image 101 currently being displayed is what number of sheets out of the total number of sheets ("1st" sheet in this example).

In this way, the display control portion, in the case of displaying a preview image in an original bundle-based processing mode, preferably displays information showing what number sheet of an original in the print job the current preview image belongs to, on the display portion. In addition, although not shown, a preview image being displayed is an image corresponding to what number of sheets of an original in a bundle of originals (subjob) may also be displayed.

The page switch keys 108 include a top page shift key for displaying a first page of the print job (job collecting subjobs), a previous page shift key for displaying a page before a current page of the print job, a next page shift key for displaying a page next to a current page of the print job, and a last page (final page) shift key for displaying a last page of the print job. The preview image 101 is displayed for each page in this manner and the user is able to display a preview image of an arbitrary page of image data of the print job by operating the page switch keys 108 as appropriate.

For example, assume that a print job is such that a first bundle of originals is 2 pages in total, a second bundle of originals is 2 pages in total, a third bundle of originals is 6 pages in total, and sum total is 10 pages. In this example, when the next page shift key of the page switch key 108 is selected twice in the GUI image 100 of FIG. 14, the GUI image 110 of FIG. 15 is displayed. In the GUI image 110, a preview image 102 of the second bundle of originals (subjob 2) is displayed. In addition, when the next page shift key of the page switch key 108 is selected twice in the GUI image 110, the GUI image 111 of FIG. 16 is displayed. In the GUI image 111, a preview image 103 of the third bundle of originals (subjob 3) is displayed.

In addition, in the GUI image 100, a copy start key 107 for actually starting copy processing (starting print processing) is displayed so as to be selectable. The user is able to actually execute printing of all subjobs by selecting the copy start key 107, when confirming the preview image 101 and a preview image of the other page after operating the page switch keys 108 or performing a confirmation of setting contents described below so as to judge there is no problem. Note that, the copy start key 107 is displayed in the GUI images 111 and 112.

The user sometimes desires to confirm actual setting contents as well as conforming by a preview display. Accordingly, a setting confirm key 105 is preferably displayed so as to be selectable in the GUI images 100, 110, and 111 of FIGS. 14 to 16. Description will be given for a configuration in which actual setting contents is able to be confirmed in this manner with reference to FIG. 17.

Figure 17:
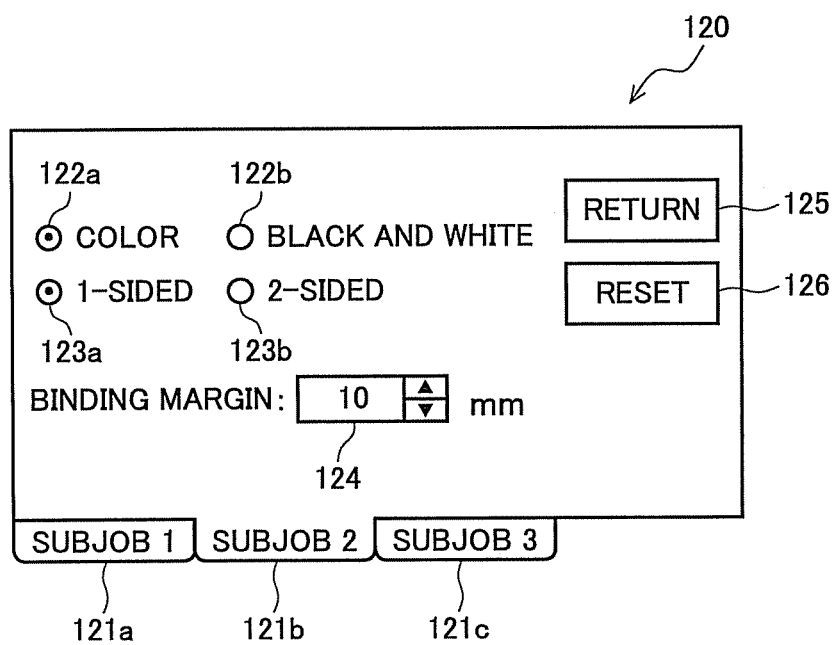
FIG. 17 is a diagram for showing an example of a GUI image displayed when selecting a setting confirm key in the GUI image of FIG. 15.

FIG. 17 is a diagram for showing an example of a GUI image displayed when a setting confirm key is selected in the GUI image of FIG. 15. When the setting confirm key 105 is selected while the GUI image 110 (the preview image 102 or a preview image of the next page) of FIG. 15 is being displayed, a subjob 2 is specified with reference to an association in the image storage portion 15 from the preview image being displayed, a GUI image 120 of FIG. 17 including setting contents for the subjob 2 is displayed.

In the GUI image 120, each of setting contents such as color/black and white (monochrome), 1-sided/2-sided, and a binding margin is displayed. As described above, setting contents displayed in the GUI image 120 is the one as to the subjob 2. However, since it may be considered that setting contents of the other subjobs 1 and 3 is desired to be confirmed or changed, tabs 121a, 121b, and 121c for displaying setting contents of each subjob are preferably displayed so as to be selectable. In addition, in the GUI image 120, a key 125 for returning to an original screen is displayed so as to be selectable.

Similarly, when the setting confirm key 105 is selected while the GUI image 100 of FIG. 14 (a preview image 101 or a preview image of the next page) is being displayed, a GUI image including setting contents for the subjob 1 is displayed. Similarly, when the setting confirm key 105 is selected while the GUI image 111 of FIG. 16 (a preview image 103 or a preview image of a sixth to a tenth page) is being displayed, a GUI image including setting contents for the subjob 3 is displayed.

In addition, in the GUI image 120, aiming that a setting is able to be further changed on the screen, a color selection radio button 122a, a black and white selection radio button 122b, a 1-sided selection radio button 123a, a 2-sided selection radio button 123b, a binding margin input area 124 are displayed. It is thereby possible, in displaying a preview of a read original in a bundle of originals-based processing mode, to easily change a setting at each subjob. In addition, in the GUI image 120, a reset key 126 for holding a setting changed by the button 122a and the like is displayed so as to be selectable.

In addition, in the GUI image 120, an example in which a setting is changeable in setting contents confirm screen has been taken, however, even in an example in which a setting contents confirm screen where a setting is not changeable is displayed, the user sometimes desires to change actual setting contents in confirming the preview images 101, 102, and 103 (FIGS. 14 to 16).

Accordingly, in the GUI images 100, 110, and 111 in FIGS. 14 to 16, the reset key 106 is preferably displayed so as to be selectable. The user, by operating the reset key 106 in the GUI images 100, 110, and 111, is able to display a GUI image for resetting print conditions (including a setting of post processing and adding processing of additional information) of a preview image (the preview images 101, 102, and 103, respectively, in this example) being displayed. Then, by using such a resetting screen, the print conditions are able to be reset only for a subjob corresponding to the preview image being displayed.

As illustrated here, the display control portion according to the present invention, in the case of displaying a preview image in an original bundle-based processing mode, displays a change key (reset key 106, the reset confirm key 105 corresponds thereto in the above-described example) for changing only print conditions of a bundle of originals being displayed as a preview image (subjob being displayed) to be selectable on the display portion by the operation portion.

It is thereby possible to eliminate unnecessary redoing, since print conditions of only a bundle of originals (subjob) being currently displayed is changed to the reset ones and print conditions of the other bundles of originals is not changed. In addition, it is not necessary to change a setting for each page and the change does not affect the setting of the other bundles of originals. In this way, according to the present invention, it is possible to easily change a setting at each subjob in displaying a preview of a read original in an original bundle-based processing mode.

In addition, after resetting, image data of a subjob based on the reset print conditions and a preview image thereof may be regenerated and the regenerated preview image may be displayed. More specifically, the preview image generating portion 16a, after selecting the change key (the reset key 106 or the setting confirm key 105), regenerates a preview image of image data, only for a subjob in which print conditions is changed by the operation portion, from the changed print conditions. Image data generated from the changed print conditions and a preview image thereof may be overwritten with reference to an association at the image storage portion 15.

In addition, the display control portion, when a preview image is regenerated (and when a preview instruction is received), preferably displays the regenerated preview image on the display portion without performing a display from the top like in the GUI image 100 of FIG. 14.

Figure 18:
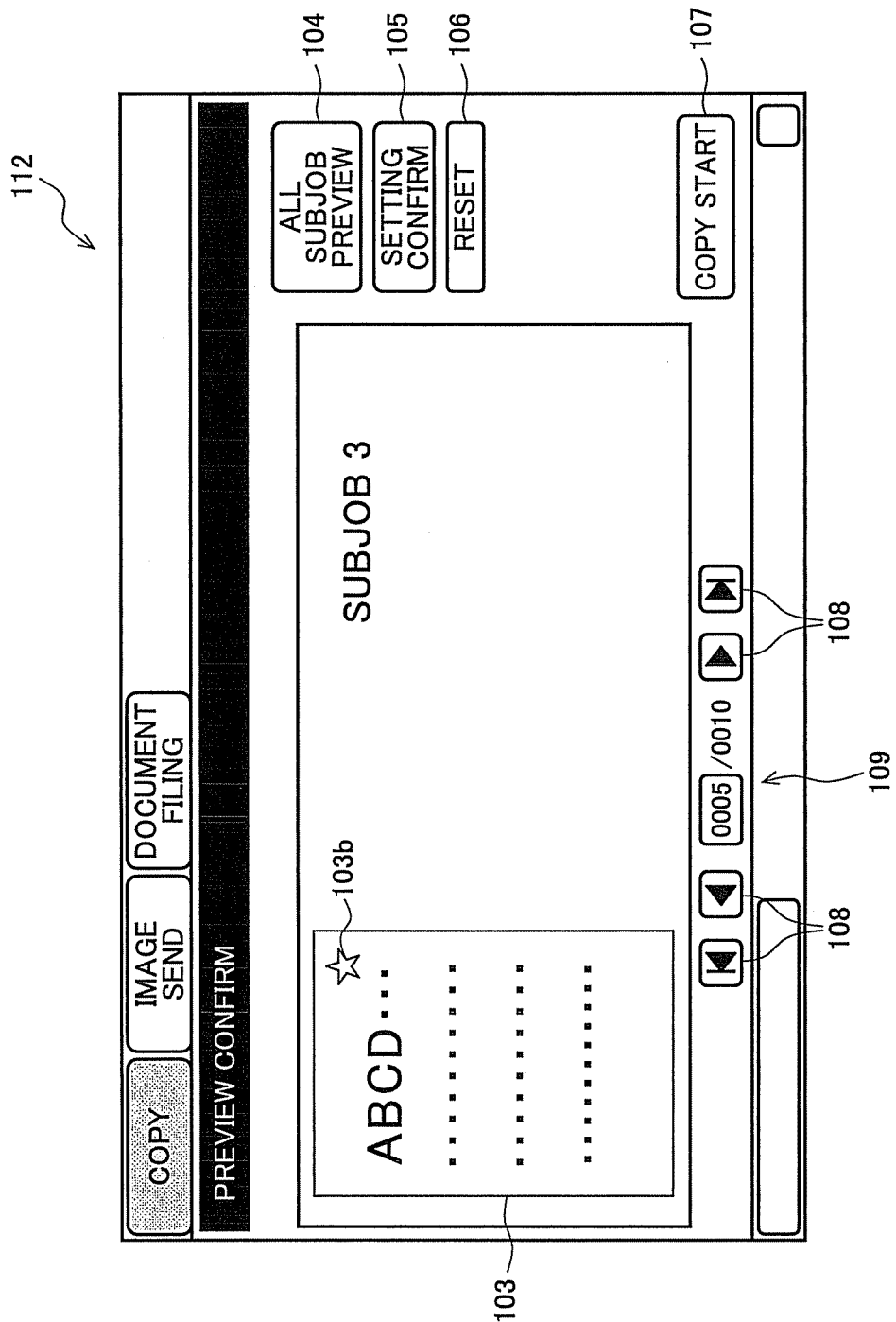
FIG. 18 is a diagram for showing an example of a GUI image displayed after selecting a reset key or a setting confirm key in the GUI image of FIG. 16 and performing resetting in the GUI image of the FIG. 17.

When a resetting of print conditions for the subjob 3 is performed, the preview image 103 of the subjob 3 is displayed like in the GUI image 112 of FIG. 18. FIG. 18 is an example of a GUI image displayed after selecting the reset key 106 (or the setting confirm key 105) in the GUI image 111 of FIG. 16 and performing a resetting of the GUI image 120 of FIG. 17. In this way, by first displaying a preview image of a subjob (a bundle of originals) in which a setting change is performed, it is possible to immediately confirm a state after resetting.

In addition, description has been given assuming that an original reading is not required again by a resetting of print conditions, however, the original reading is required in some cases. Accordingly, the display control portion, after selecting the change key (the reset key 106 or the setting confirm key 105), for a subjob in which print conditions is changed, when an original reading is required again due to the change, may display a notification to prompt another original reading of a bundle of originals corresponding to the subjob that is the object of the change of print conditions on the display portion.

For example, assume that a setting is such that color printing/monochromatic printing is automatically selected as a result of performing automatic recognition of an original. In addition, assume that a color area is slightly included in the subjob 3, and as a result of the automatic recognition, the color area is not able to be recognized and the monochromatic printing is selected, and the preview image 103 together with the color area 103a are generated/displayed in monochrome. In a case of having seen the original and noticing the failure in recognition by the GUI image 111 of FIG. 16, the user selects the reset key 106 and reset to "color printing" from the resetting screen. Thus the above-described notification is made by a pop-up image and the like to the touch panel 32 to prompt remounting of a third bundle of originals on an ADF. The digital multi-functional peripheral 1 executes an original reading for the remounted third bundle of originals, regenerate a color image data and a preview image thereof, and overwrite an original monochromatic image data and a preview image thereof. Then, a preview image 103 in which a color area 103b is colored like in the GUI image 112 of FIG. 13 may be displayed.

Examples of print conditions that may require another original reading include conditions of an enlarging ratio and a reducing ratio as well as conditions showing whether color printing is performed or monochromatic printing is performed. In a case where print conditions is changed from monochromatic printing to color printing and in a case where a reducing ratio is decreased or an enlarging ratio is increased, the above notification may be performed.

Note that, in a case where a setting of an original reading of the digital multi-functional peripheral 1 itself is a setting for reading for all print conditions at the highest resolution taking no account of a reading speed, such rereading is not necessary all the time. Of course, rereading is necessary in a case where a page is missing due to a feeding error by an ADF, however, that is not determined by the digital multi-functional peripheral 1 side, but by the user, and the digital multi-functional peripheral 1 may be configured such that rereading is possible as necessary.

Figure 19:
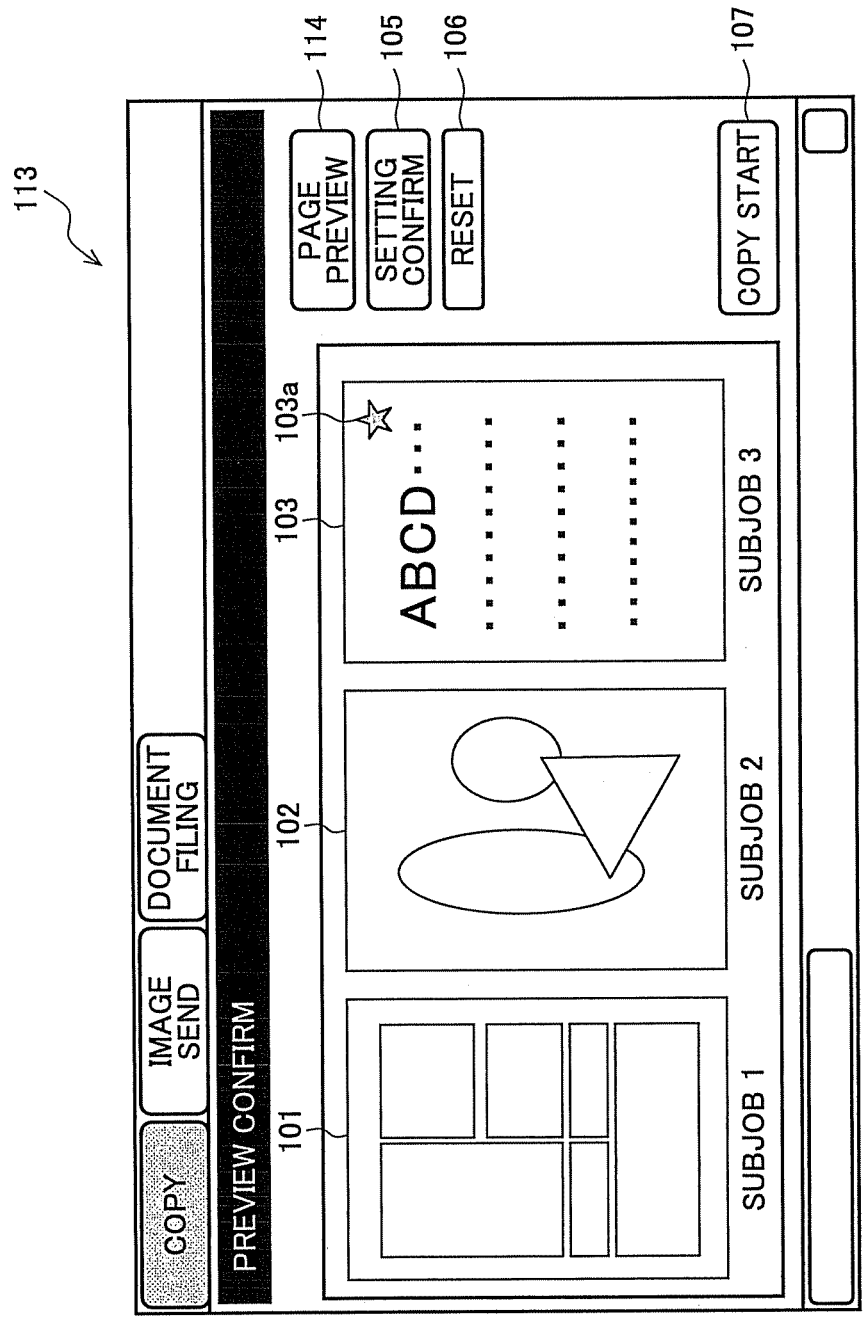
FIG. 19 is a diagram for showing an example of a GUI image displayed when selecting all subjob preview key in the GUI images of FIGS. 14 to 16.

In addition, in the GUI images 100, 110, and 111, an all subjob preview key (all thumbnail display key) 104 for displaying a thumbnail image of a top page of all subjobs (all bundles of originals) is preferably displayed so as to be selectable. Such an example will be described with reference to FIG. 19. FIG. 19 is a diagram for showing an example of a GUI image displayed when an all subjob preview key is selected in a GUI image from FIGS. 14 to 16.

The user is able to confirm a thumbnail display like in the GUI image 113 of FIG. 19 by selecting the all subjob preview key 104. In the GUI image 113, the preview image generating portion 16a generates each of thumbnails images 101 to 103, from image data of each subjob to be printed, that is displayed for previewing on the touch panel 32 by the panel control portion 11. Note that, description is given here for an example in which three bundles of originals (that is, three subjobs) are included similarly to the above-described example, the number of which is not limited thereto.

For example, when print conditions of the subjobs 1 and 3 are color printing, and print conditions of the subjob 2 are monochromatic printing, the thumbnail image 101 of the top page of the subjob 1, and the thumbnail image 103 of the top page of the subjob 3 are displayed in color, and the thumbnail image 102 of the top page of the subjob 2 is displayed in monochrome. Furthermore, in a case where additional information such as a stamp or a page number, or contents of post processing are different in each subjob, thumbnail images in accordance therewith are able to be displayed. Note that, generally, the post processing such as punching or stapling is often a common setting in all the subjobs (that is, all the bundles of originals).

In addition, also in the GUI image 113, the setting confirm key 105, the reset key 106, and a copy start key 107 may also be displayed so as to be selectable. Note that, while thumbnails of top pages of all bundles of originals are displayed like in the GUI image 113, the reset key 106 or the setting confirm key 105 functions as the above change key at the point when selecting any of thumbnail images.

Furthermore, in the GUI image 113, a page preview key 114 for returning to GUI images 100, 110, and 111 of FIGS. 14 to 16 may also be displayed so as to be selectable. The page preview key 114 is a key for confirming pages other than a top page of each subjob by a preview, and the user, by selecting one which is desired to confirm out of thumbnail images 101 to 103 displayed to be selectable and selecting the key 114, is able to return to the GUI image 110 of FIG. 15 such that a selected thumbnail image (thumbnail image 102, for example) is included as a preview image. In addition, processing such as, even without performing a display of the page preview key 114, selecting one of (or selecting 2 consecutive times) thumbnail images 101 to 103 to shift to a page preview display screen like in the GUI image 100 of FIG. 14 related to the selected thumbnail image, may be employed.

In this way, by arranging and displaying the thumbnail images 101 to 103 of the top page of each of subjobs 1 to 3, a setting at each of subjobs 1 to 3 is able to be confirmed easily and in a short time.

Figure 20A:
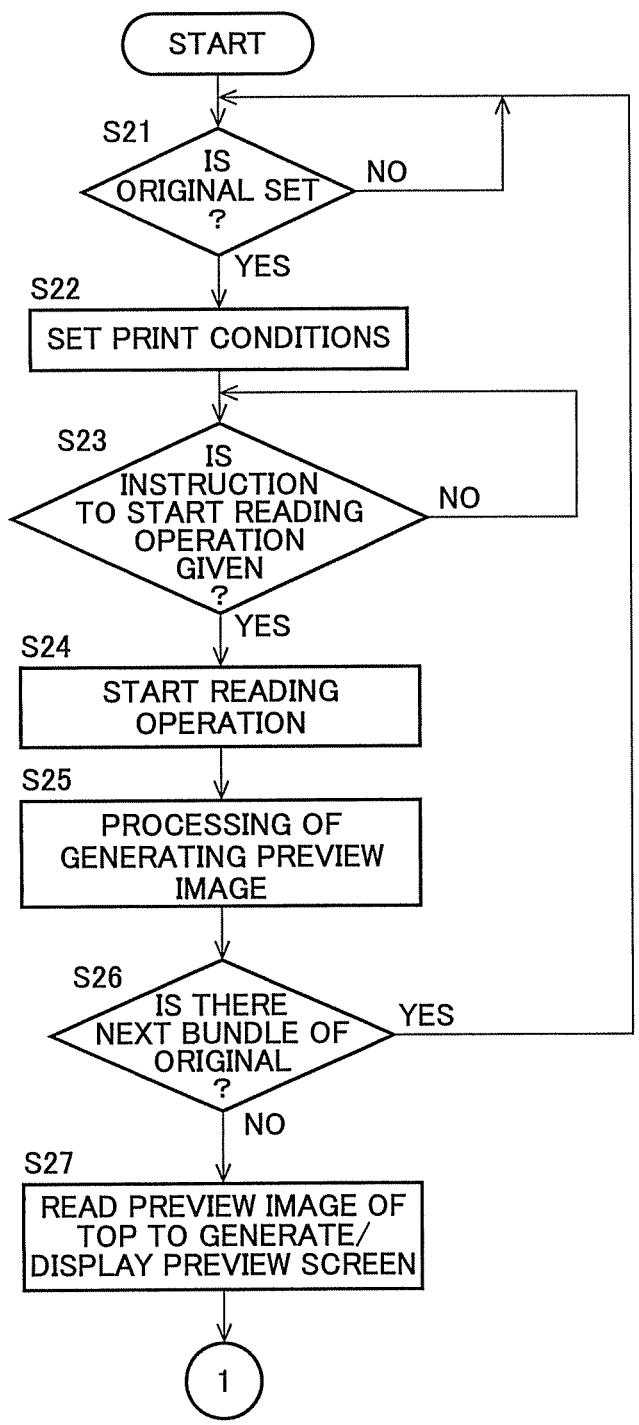
FIGS. 20A and B are a flowchart for explaining an example of processing when displaying a preview in the original bundle-based processing mode in the digital multi-functional peripheral of FIGS. 2 and 3.
Figure 20B:
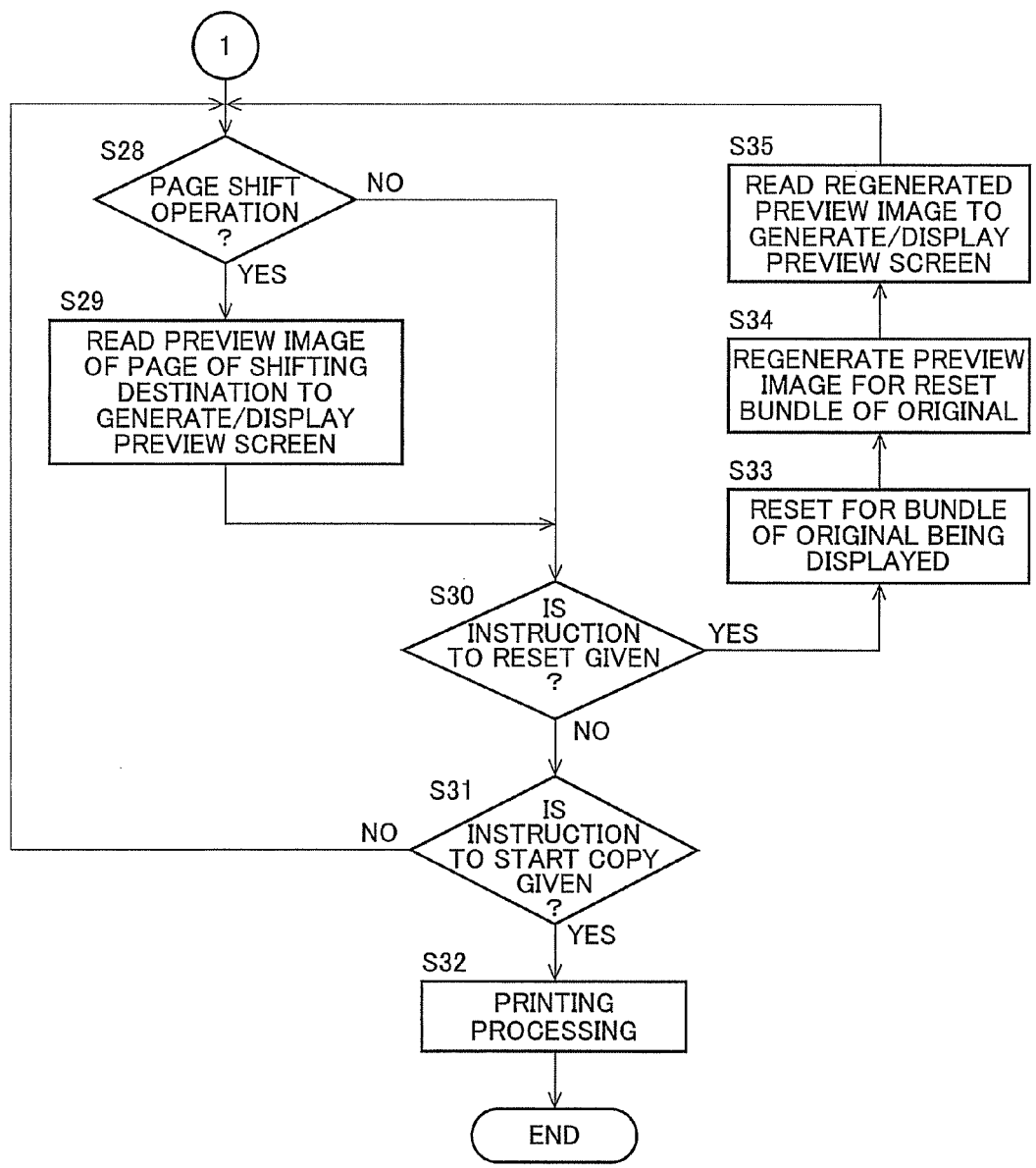

Next, description will be given for an example of a flow when an original image to be printed (the object of image formation) is read to be displayed for previewing with reference to FIGS. 20A and 20B. FIGS. 20 A and 20B are a flowchart for explaining an example of processing when performing a preview display in an original bundle-based processing mode in the digital multi-functional peripheral of FIGS. 2 and 3. Here, description will be given assuming that it is in an original bundle-based processing mode and a preview display is performed.

First, the main control portion 18 confirms whether an original is set on a document platen or an ADF in the reading portion 13 (step S21), and when the original is set (in the case of YES at step S21), a user operation for setting print conditions is received to reflect the setting (step S22).

Then, the main control portion 18 waits for an instruction to start a reading operation (depressing operation of a start key, for example) (step S23), and when the instruction is received, the reading portion 13 is instructed to perform original reading (step S24). Whereby, the reading portion 13 starts the original reading. Subsequently, the main control portion 18 instructs the preview image generating portion 16a to execute processing of generating a preview image based on the read image data (step S25).

Next, the main control portion 18 displays the GUI image 60 of FIG. 8 and waits for a user operation, and based on the user operation, determines whether or not there is a next bundle of originals (step S26). When there is the next bundle of originals, steps S21 to S25 are repeated for the next bundle of originals. At the point when it is able to be determined that there is no next bundle of originals (in the case of NO at step S26), the main control portion 18 instructs the panel control portion 11 and the preview image generating portion 16a to generate a preview screen, from a preview image of a top page of the first bundle of originals, that is displayed on the touch panel 32 (step S27). By this processing, for example, the GUI image 100 of FIG. 14 is displayed.

In a state where the GUI image 100 is displayed, the main control portion 18 determines whether or not the page switch key 108 is selected (step S28). When the page switch key 108 is selected, the main control portion 18 instructs the panel control portion 11 and the preview image generating portion 16a to generate and display a preview image of the page (step S29). By this processing, for example, the GUI image 110 of FIG. 15 is displayed.

On the other hand, in the case of NO at step S28 or after a processing of step S29, the main control portion 18 determines whether or not selection of the reset key 106 (or the reset key 105) is performed (step S30). The main control portion 18, in the case of NO at step S30, determines whether or not selection of the copy start key 107 is performed (step S31), when selection of the copy start key 107 is performed, executes print processing (step S32).

In the case of NO at step S31, the procedure may return to step S28 or S30. In the case of YES at step S30, the main control portion 18 controls the panel control portion 11 to display the resetting screen (GUI image 120 of FIG. 17, for example) and to wait for a resetting operation from the user, and executes a resetting (a resetting for a subjob having displayed a preview image) based on the operation (step S33). Next, the main control portion 18 gives an instruction to the preview image generating portion 16a to regenerate a preview image of a reset subjob (step S34), and gives instruction to the panel control portion 11 to display the regenerated preview image. By this processing, for example, the GUI image 112 of FIG. 18 is displayed.

In the above, description has been given for an example of, when the NO key 62 is selected in the GUI image 60 of FIG. 8, firstly displaying a preview image of a top page of all bundles of originals (that is, a preview image of a top page of the first bundle of originals) of FIG. 14. As an alternative, when the NO key 62 is selected, the thumbnail images 101 to 103 of a top page of each bundle of originals may be displayed like in the GUI image 113 of FIG. 19. In this case, when the user desires to display a preview image of each bundle of originals as one body, the page preview key 114 may be selected. In this way, FIG. 19 is a diagram for showing another example of a GUI image displayed when the NO key is selected in the GUI image of FIG. 8 (example different from a GUI image of FIG. 14) and also shows another example of a screen displayed for previewing in an original bundle-based processing mode in the digital multi-functional peripheral of FIGS. 2 and 3.

In addition, description has been given for the preview display in an original bundle-based processing mode according to the present invention, however, in the above description, it is assumed that any of the bundles of originals does not exceed the number of sheets readable on an ADF. However, actually that exceeds in some cases. For example, when the number of sheets readable on an ADF is 100 sheets, an upper limit of one bundle of originals is 100 sheets, and there is a case when the same print conditions is desired to be applied for a bundle of originals of 101 sheets or more.

In such a case, when 200 sheets, for example are desired to be printed with the same print conditions, an original reading processing may be executed for the 2 bundles of originals keeping the same print conditions. In this case, in the GUI image 113 of FIG. 19, thumbnail images of a top page of each of the 2 bundles of originals are displayed by a list. On the other hand, when such a display is desired to be avoided, "IS THERE STILL ANY ORIGINAL DESIRED TO BE PRINTED CONTINUOUSLY UNDER THE SAME PRINT CONDITIONS", or the like, is displayed after an original reading and "Yes" is input, it may be configured that the first 100 sheets and the next 100 sheets are treated as one subjob. In this case, mass original processing exceeding the number of sheets capable of being read by an ADF is possible by this single subjob.

In the above, description has been given for the preview display in an original bundle-based processing mode with reference to the digital multi-functional peripheral 1, however, the present invention may be embodied as a preview display method in such an image forming apparatus. That is, this preview display method includes a step in which an operation portion receives a selection of an original bundle-based processing mode, a step in which an operation portion receives an operation for displaying a preview image, a step in which a display control portion, in the case of displaying a preview image in an original bundle-based processing mode, displays a change key for changing only print conditions of a bundle of originals being displayed as a preview image to be selectable on a display portion by the operation portion, and a step in which the operation portion receives selection of the change key, and after the reception, receives an operation for changing print conditions for a subjob of a bundle of originals having been displayed as a preview image.

In addition, this preview display method may further include a step in which a preview image generating portion regenerates a preview image of image data from the changed print conditions only for a subjob that has received an operation to change print conditions, and a step in which the display control portion, when a preview image is regenerated by the preview image generating portion, displays the regenerated preview image on a display portion. Another example of application is as has been described.

<Effect of the Present Invention>

According to the present invention, in an original bundle-based processing mode, in which a plurality of subjobs are treated as one job, when a read original is displayed for previewing, a setting at each subjob is able to be confirmed easily.

Furthermore, according to another embodiment of the present invention, in an original bundle-based processing mode in which a plurality of subjobs are treated as one job, when a read original is displayed for previewing, a setting at each subjob is able to be changed easily.

The invention claimed is:

1. An image forming apparatus, comprising:
an operation portion, a display portion, and a display control portion for displaying a preview image of image data to be printed on the display portion, wherein
an original bundle-based processing mode is selectable by the operation portion in the image forming apparatus,
the original bundle-based processing mode is a mode for executing a plurality of subjobs each corresponding to a plurality of bundles of originals that are objects of original reading, to each of which print conditions is set, as one print job,
when the preview image is displayed in the original bundle-based processing mode, the display control portion generates a thumbnail image by reducing image data of a top page of each subjob, arranges the generated thumbnail image corresponding to each subjob as the preview image to be displayed on the display portion, and displays each generated thumbnail image together on the display portion, and
the display control portion displays each thumbnail image of the top page corresponding to each subjob so as to be selectable by the operation portion and, when one of the thumbnail images being displayed is selected by the operation portion, displays a top page, a next page, or a final page of a bundle of originals corresponding to the selected thumbnail images as the preview image on the display portion.

2. The image forming apparatus as defined in claim 1, wherein the display control portion displays, together with image data of the top page of the bundle of originals corresponding to the selected thumbnail image, a page change key for displaying other pages of the bundle of originals so as to be selectable by the operation portion on the display portion.

3. The image forming apparatus as defined in claim 1, wherein the display control portion displays, together with the thumbnail image of the top page for each subjob, a change key for changing print conditions for each of the bundle of originals so as to be selectable by the operation portion on the display portion.

4. A preview display method in an image forming apparatus provided with an operation portion, a display portion, and a display control portion for displaying a preview image of image data to be printed on the display portion, wherein
an original bundle-based processing mode is selectable by the operation portion in the image forming apparatus and the original bundle-based processing mode is a mode for executing a plurality of subjobs each corresponding to a plurality of bundles of originals that are objects of original reading, to each of which print conditions is set, as one print job, and
the preview display method comprising:
a step in which the operation portion receives a selection of the original bundle-based processing mode;
a step in which the operation portion receives an operation to display the preview image; and
a step in which, when displaying the preview image in the original bundle-based processing mode, the display control portion generates a thumbnail image by reducing image data of a top page of each subjob, arranges the generated thumbnail image corresponding to each subjob as the preview image to be displayed on the display portion, and displays each generated thumbnail image together on the display portion,
wherein the display control portion displays each thumbnail image of the top page corresponding to each subjob so as to be selectable by the operation portion and, when one of the thumbnail images being displayed is selected by the operation portion, displays a top page, a next page, or a final page of a bundle of originals corresponding to the selected thumbnail images as the preview image on the display portion.

5. The preview display method as defined in claim 4, further including:
a step in which the display control portion displays, together with the thumbnail image of the top page for each subjob, a change key for changing print conditions for each of the bundle of originals so as to be selectable by the operation portion on the display portion.

6. An image forming apparatus, comprising:
an operation portion, a display portion, a preview image generating portion for generating a preview image of image data to be printed, and a display control portion for displaying the preview image generated by the preview image generating portion on the display portion, wherein
an original bundle-based processing mode is selectable by the operation portion in the image forming apparatus,
the original bundle-based processing mode is a mode for executing a plurality of subjobs each corresponding to a plurality of bundles of originals that are objects of original reading, to each of which print conditions is set, as one print job,
when displaying the preview image in the original bundle-based processing mode, the display control portion generates a thumbnail image by reducing image data of a top page of each subjob, arranges the generated thumbnail image corresponding to each subjob as the preview image to be displayed on the display portion, displays each generated thumbnail image together on the display portion, and displays a change key for changing only print conditions of a bundle of originals being displayed as the preview image so as to be selectable by the operation portion on the display portion, and
the display control portion displays each thumbnail image of the top page corresponding to each subjob so as to be selectable by the operation portion and, when one of the thumbnail images being displayed is selected by the operation portion, displays a top page, a next page, or a final page of a bundle of originals corresponding to the selected thumbnail images as the preview image on the display portion.

7. The image forming apparatus as defined in claim 6, wherein, after selection of the change key, the preview image generating portion regenerates a preview image of image data only as to a subjob whose print conditions is changed by the operation portion, from changed print conditions, and when the preview image generating portion regenerates the preview image, the display control portion displays the regenerated preview image on the display portion.

8. The image forming apparatus as defined in claim 6, wherein, when displaying the preview image in the original bundle-based processing mode, the display control portion displays information showing what number bundle processed in the print job the current preview image belongs to, on the display portion.

9. The image forming apparatus as defined in claim 6, wherein, when displaying the preview image in the original bundle-based processing mode, the display control portion displays information showing what number sheet of an original in the print job the current preview image belongs to, on the display portion.

10. The image forming apparatus as defined in claim 6, wherein, after selection of the change key, when the change requires another original reading as to a subjob whose print conditions is changed by the operation portion, the display control portion displays a notification to prompt another original reading of a bundle of originals corresponding to a subjob that is an object of change of print conditions, on the display portion.

11. A preview display method in an image forming apparatus provided with an operation portion, a display portion, a preview image generating portion for generating a preview image of image data to be printed, and a display control portion for displaying a preview image generated by the preview image generating portion on the display portion, wherein an original bundle-based processing mode is selectable by the operation portion in the image forming apparatus and the original bundle-based processing mode is a mode for executing a plurality of subjobs each corresponding to a plurality of bundles of originals that are objects of original reading, to each of which print conditions is set, as one print job, and the preview display method comprising:

a step in which the operation portion receives a selection of the original bundle-based processing mode;

a step in which the operation portion receives an operation to display the preview image;

a step in which, when displaying the preview image in the original bundle-based processing mode, the display control portion generates a thumbnail image by reducing image data of a top page of each subjob, arranges the generated thumbnail image corresponding to each subjob as the preview image to be displayed on the display portion, displays each generated thumbnail image together on the display portion, and displays a change key for changing only print conditions of a bundle of originals being displayed as the preview image so as to be selectable by the operation portion on the display portion; and a step in which the operation portion receives a selection of the change key, and after the reception, receives an operation to change print conditions as to a subjob of the bundle of originals being displayed as the preview image, wherein the display control portion displays each thumbnail image of the top page corresponding to each subjob so as to be selectable by the operation portion and, when one of the thumbnail images being displayed is selected by the operation portion, displays a top page, a next page, or a final page of a bundle of originals corresponding to the selected thumbnail images as the preview image on the display portion.

12. The preview display method as defined in claim 11, further including:

a step in which the preview image generating portion regenerates a preview image of image data only as to a subjob, to which an operation to change the print conditions is received, from changed printing conditions; and a step in which, when the preview image generating portion regenerates a preview image, the display control portion displays the regenerated preview image on the display portion.

* * * * *